US007406528B2

(12) United States Patent
Kurita et al.

(10) Patent No.: US 7,406,528 B2
(45) Date of Patent: Jul. 29, 2008

(54) METHOD FOR COMMUNICATION

(75) Inventors: Chikako Kurita, Tokyo (JP); Hisashi Toyoshima, Hachiouji (JP); Kayoko Sakaguchi, Tokyo (JP); Ryohei Shiotani, Narashino (JP); Nobuaki Ono, Matsudo (JP); Masaki Miyadera, Yachiyo (JP); Takashi Kawahara, Shiki (JP)

(73) Assignee: Hitachi, Ltd., Tokyo (JP)

( * ) Notice: Subject to any disclaimer, the term of this patent is extended or adjusted under 35 U.S.C. 154(b) by 973 days.

(21) Appl. No.: 10/309,228

(22) Filed: Dec. 4, 2002

(65) Prior Publication Data
US 2003/0103603 A1   Jun. 5, 2003

(30) Foreign Application Priority Data
Dec. 5, 2001 (JP) ............................. 2001-370830
Jul. 12, 2002 (JP) ............................. 2002-203735

(51) Int. Cl.
*G06F 15/16* (2006.01)
(52) U.S. Cl. ..................................................... 709/228
(58) Field of Classification Search ................ 709/200, 709/228
See application file for complete search history.

(56) References Cited
U.S. PATENT DOCUMENTS
6,094,675 A * 7/2000 Sunaga et al. ............... 709/204

2001/0054184 A1 * 12/2001 Watanabe et al. ............. 725/59

FOREIGN PATENT DOCUMENTS
JP     9-231040 A     9/1997

OTHER PUBLICATIONS
"Networking Community" by Kenichi Ikeda, 1997 Publishing Department of Tokyo University.
IPSJ Groupware 10-2, Mar. 2, 1995, pp. 1-12.

* cited by examiner

*Primary Examiner*—Jason Cardone
*Assistant Examiner*—Mitra Kianersi
(74) *Attorney, Agent, or Firm*—Mattingly, Stanger, Malur & Brundidge, P.C.

(57) ABSTRACT

A method of communication involving processing by instruction using one or a combination of information units, when a user instructs a terminal to display contents and procedure of a communication, or to totalize the contents of the communication, or when a manager terminal instructs a field of the communication to provide a function of the communication corresponding to an object or stage of the communication. Information units forming the contents of the communication include cards, and information units forming premising information of a communication and a basis of the communication include boards. An information unit comprises a board identifier and attribute information for specifying a function of a board, such as a relationship between the board and cards. To provide a communication function corresponding to an object and stage of the communication, a template conforms to the object and stage so a manager can select and utilize the template.

16 Claims, 38 Drawing Sheets

FIG.3

```
                                    ┌─301 userID
<user data>
    <userID>000123</userID>
    <date of update>20010920</date of update>      ┌─302 password
    <password>azpqmm67</password>
    <registration date>20010320</registration date>
    <authority>user</authority>
    <user's name>Aiko Kashino</user's name>
    <nickname>Ai</nickname>
    <residence>1-1-1, Nanboku-shi, Tozai-ken</residence>
    <mail address>ai@abcd.com</mail address>
    <a word comment>I run a Japanese-style confectionery at 2-chome.
    Your favor is expected. </a word comment>
    <disclosure of a word comment>true</disclosure of a word comment>
    <disclosure of a name>false</disclose of a name>
    <disclosure of nickname>true</disclosure of nickname>
    <disclosure of mail address>false</disclosure of mail address>
    <URL>www.wagashi-aiko.co.jp</URL>
</user data>
```

300 user data

400 board data

```
<board data>
    <board ID>000010</board ID>          ─── 401 board ID
    <date of update>20010920</date of update>
    <board title>citizen-based town planning of Tozai-shi    ─── 402 board title
    </board title>
    <manager ID>000009</manager ID>       ─── 403 manager ID
    <manager's name>Taro Tozai</manager's name>
    <mail address of manager>tozai@tozai.go.jp</mail address of manager>
    <board comment>think tomorrow of Tozai-shi</board comment>
    <file name of board picture image>plan1.jpg</file name            404
    of board picture image>                                           board comment
    <position of picture image in board region>0</position     ┐
    of picture image in board region>                          │ 406
    <length of board size>1000</length of board size>          ├ picture image
    <width of board size>1000</width of board size>            │ size information
    <status>1</status>                                         ┐
    <password></password>                                      ├ 407 status
    <number of comment letters displayed in a row>12           ┐
    </number of comment letters displayed in a low>            │ 408
    <font size>10</font size>                                  ├ card classification
    <registration date of board>20010910</registration         │ information
    date of board>                                             ┘
    <board type>communityboard</board type>    ─── 411 board type
    <position of board picture image information>x:50≦         ┐
    vitalization of shopping district≦300</position of board   │ 410
    picture image information>                                 ├ board picture
    <position of board picture image information>x:310≦        │ image information
    barrier-free≦500</position of board picture image          │
    information>                                               ┘
</board data>     ─── 409 card type
<card type>                         ─── 412 image
    <image="false">                 ─── 413 vote
    <vote="true">                   ─── 414 genre
    <genre="true">
        <item>approval</item>
        <item>disapproval</item>
        <item>question</item>
        <item>proposal</item>
    </genre>            ─── 415 color
    <color="true">
        <item="approval">blue</item>
        <item="disapproval">pink</item>
        <item="question">purple</item>
        <item="proposal">green</item>
    </color>
</card type>
```

FIG.5

```
                                                                  500 card data
<card data>                          501 card ID
    <card ID>000789</card ID>
                                          502 board ID
    <date of update>20010919</date of update>
    <board ID>000010</board ID>              503 contents of comment
    <contents of comment> Internet can be also utilized in a Japanese-style
    confectionery. Plans for creative Japanese-style confectionery limited to
    the season have been invited on the net. Votes were given to several plans
    on the net. Japanese-style confectionery becoming most popular were
    actually manufactured and sold. Many inquiries were received and sales
    figures were increased. </contents of comment>
    <card position X coordinate>215</card position X coordinate>  504
    <card position Y coordinate>355</card position Y coordinate>  card position
    <registration date>20010919</registration date>               information
    <user ID>000123</user ID>         505 user ID
    <user's name>Ai</user's name>
    <link card ID>0000623</link card ID>   } 506
    <link card ID>0000623</link card ID>   } link information
    <link background position/>    507 link background position information
    <image/>      508 image information
    <vote>
        <pros type="netID">000022,000103</pros>
        <pros type="guest">3</pros>
        <neutral type="netID">000111,000127</neutral>     509
        <neutral type="guest">1</neutral>                 vote information
        <cons type="netID"/>
        <cons type="guest"/>
    </vote>
    <genre>approval</genre>   510 genre information
    <color>181,255,181</color>   511 color information
</card data>
```

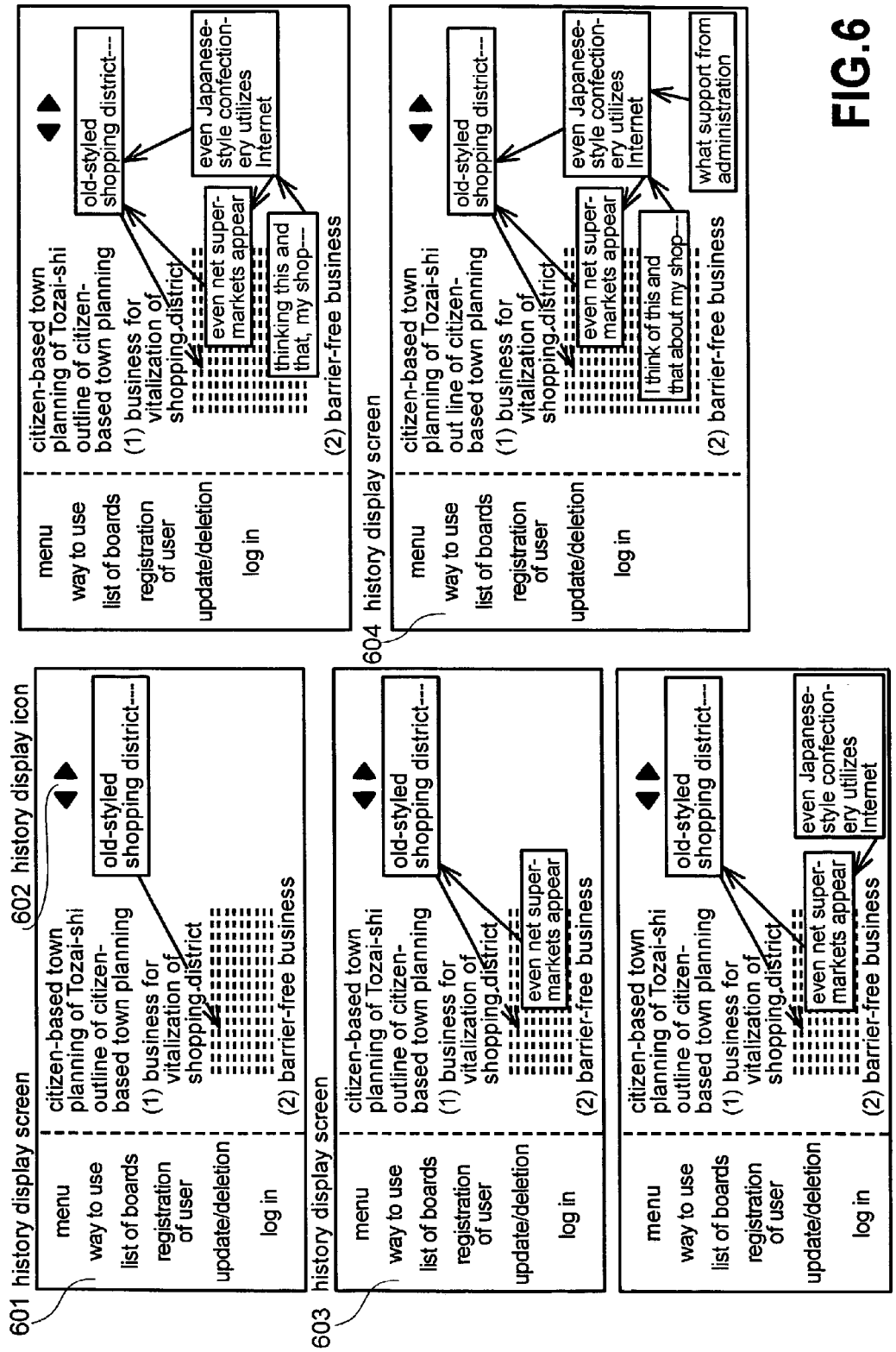

FIG.8

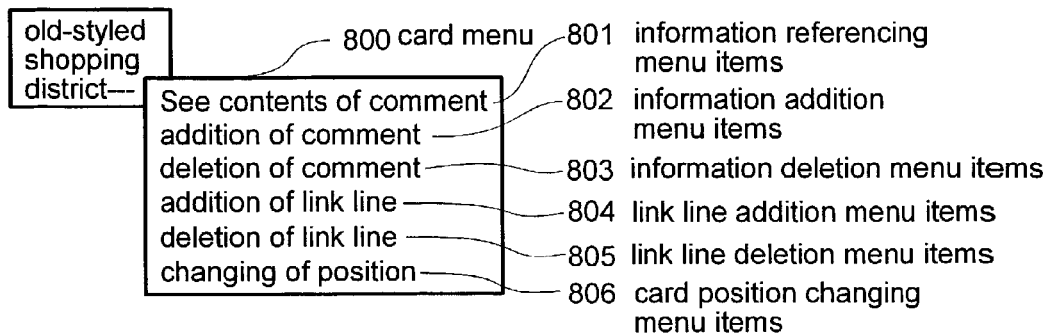

- 800 card menu
- 801 information referencing menu items
- 802 information addition menu items
- 803 information deletion menu items
- 804 link line addition menu items
- 805 link line deletion menu items
- 806 card position changing menu items

FIG.9

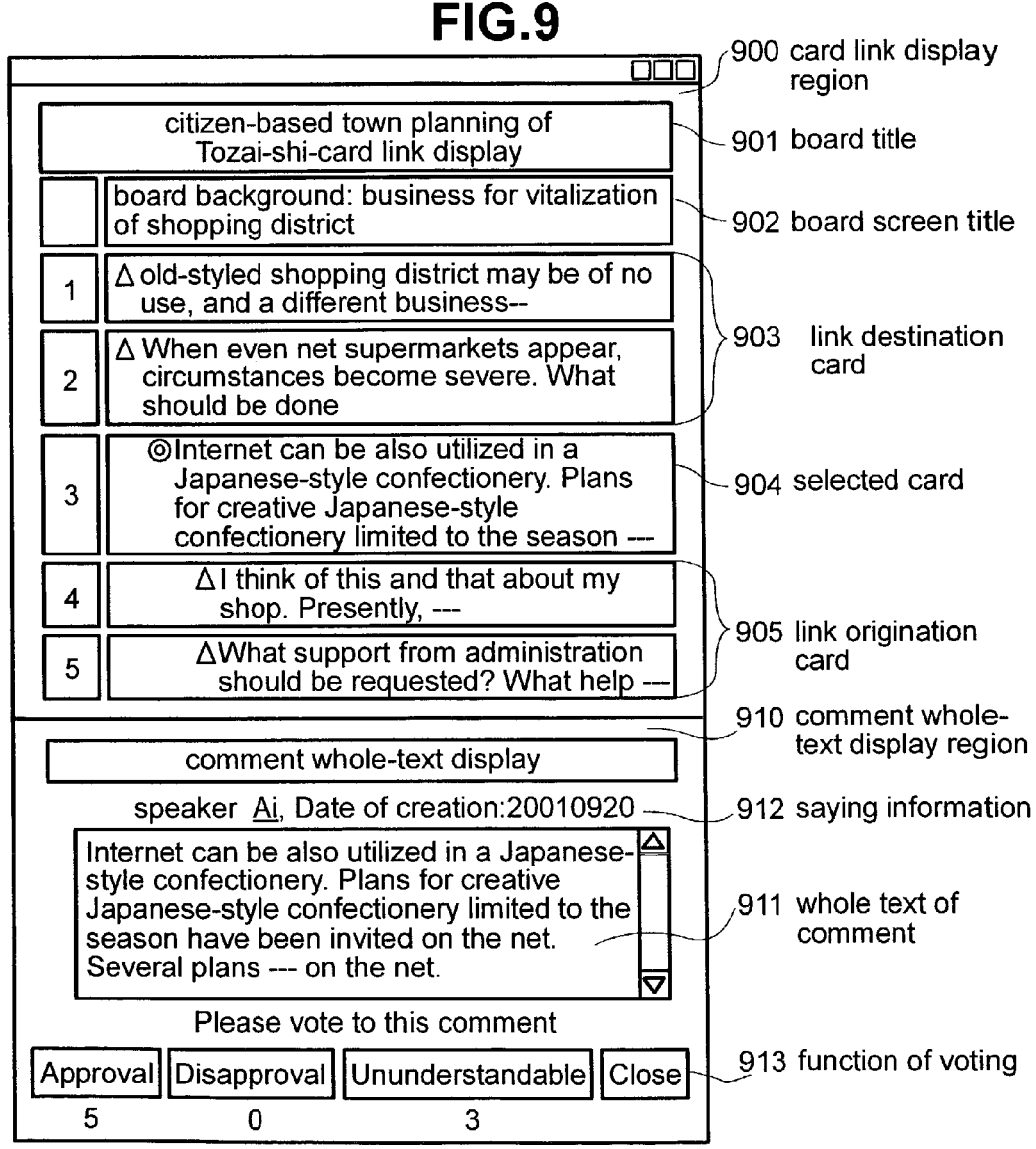

- 900 card link display region
- 901 board title
- 902 board screen title
- 903 link destination card
- 904 selected card
- 905 link origination card
- 910 comment whole-text display region
- 912 saying information
- 911 whole text of comment
- 913 function of voting

FIG.13

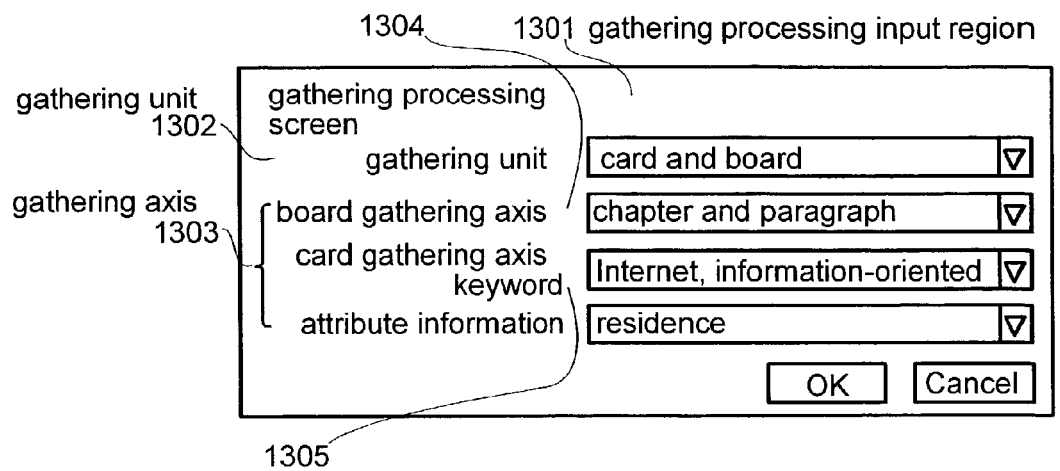

1304  1301 gathering processing input region
gathering unit 1302 — gathering processing screen
gathering unit — card and board
gathering axis 1303 — board gathering axis — chapter and paragraph
card gathering axis keyword — Internet, information-oriented
attribute information — residence
1305 — OK  Cancel

FIG.14

1402  1401 gathering result display region gathering results list of gathering results

| contents of board-first chapter | number of cards | attribute information |
|---|---|---|
| business for vitalization of shopping district | 6 | Aomachi-2, Akamachi-2 |
| barrier-free business | 3 | Midorimachi-2 |
| local university | 15 | Shiromachi-5, Midorimachi-3 | continued comment contents

1403

FIG.19
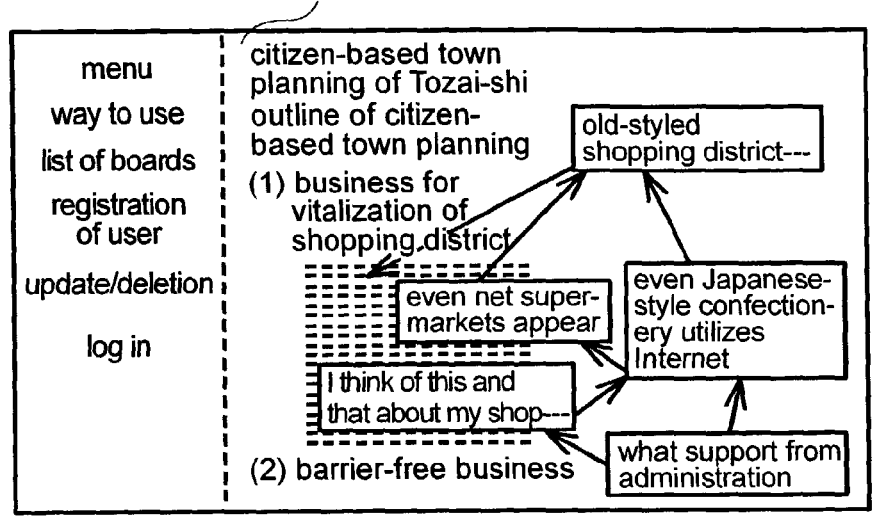
1900 fundamental card display screen image
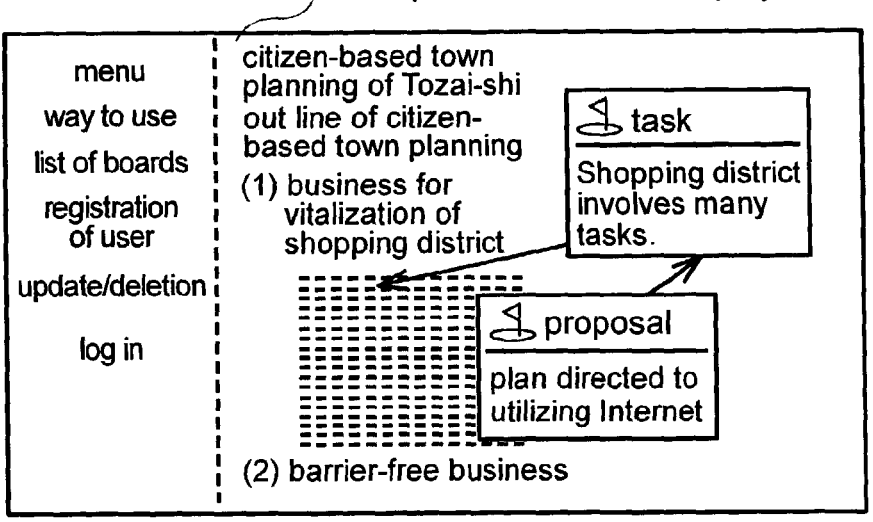
1901 representative card display screen image
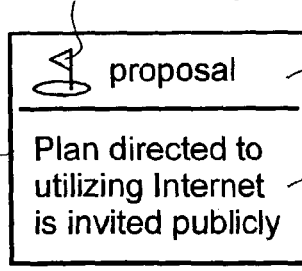
1903 card type icon
representative card 1902
card data display region 1904
comment display region 1905

FIG.20

| board type | community board ▽ | |
|---|---|---|
| board title | citizen-based town planning for Nanboku-shi | |
| a word comment | citizen-based town planning for vitalizing the district is contemplated. Many opinions are expected. ▽ △ | 2005 / 2006 |
| board size (width) | 1000 | 2007 |
| board size (height) | 1000 | 2008 |
| number of letters of a comment displayed in a line | 12 | 2009 |
| font size of card | 10 ▽ | 2012 |
| font size of comment input /display | standard ▽ | 2013 |
| selection of function of card | ☑ with image | |
| | ☑ with function of vote | |
| | ☑ indication of genre of card | 1) question  2) reply  3) proposal  4) opinion  5) others |
| | ☑ indication of color of card | 1) approval — blue ▽ (2023) 2) disapproval — pink ▽ (2024) 3) question — green ▽ (2025) 4) reply — yellow ▽ (2026) 5) others — purple ▽ (2027) |
| manager ID | 000001 | 2028 |
| manager's name | manager | 2029 |
| mail address of manager | ai@tokio.ne.jp | 2030 |
| setting of members | qualified member ▽ | 2031 |
| password | | 2032 |
| display position of background picture image | upwardly leftward ▽ | 2034 |
| file name of background picture image | | reference | 2036 |

[Register] [Reset]

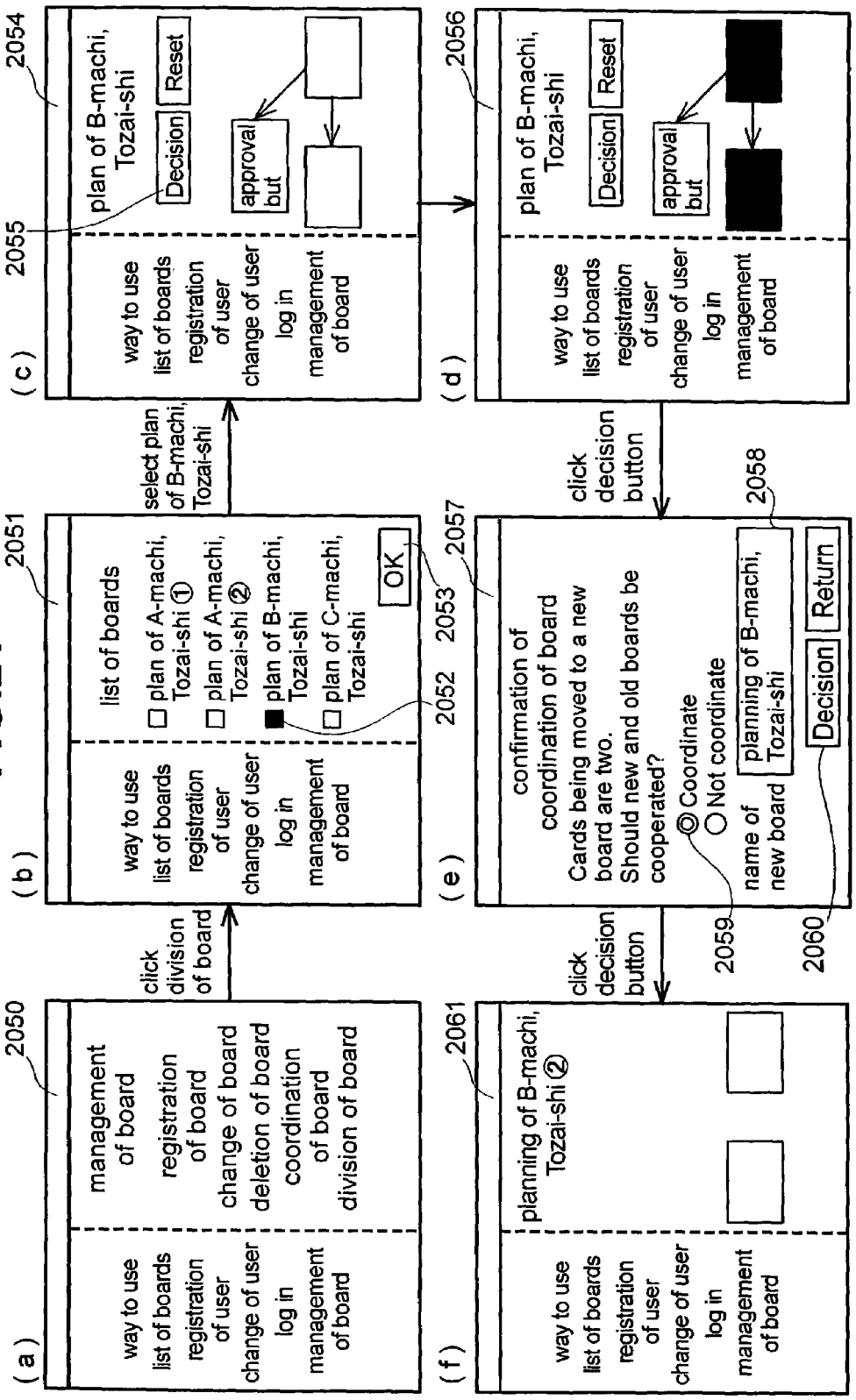

FIG.23

| selection of board | | |
|---|---|---|
| Please select a board and click OK button. | group title | special edition of A-machi |
| manager's name | board ID | title |
| manager A | 000237 | town planning of A-machi |
| manager A | 000236 | map of A-machi |
| manager A | 000235 | calender of A-machi |

OK  Return

2079

FIG.24 special edition of A-machi  2074 map of A-machi ▽

--- coordinated board---
town planning of A-machi
map of A-machi
calender of A-machi

FIG.25

| | selection of board | | |
|---|---|---|---|
| Please select a board and input a title of coordinated group | | convenient map of Tozai-shi | |
| object of change | manager's name | board ID | title |
| ☑ | manager A | 000237 | town planning of A-machi |
| ☑ | manager A | 000236 | map of A-machi |
| ☑ | manager A | 000235 | calender of A-machi |

⦿ Please input a manager ID and a board ID when boards of other managers should be added to a list

| manager ID | 000002 | board ID | 000231 |
| manager ID | 000002 | board ID | 000233 |
| manager ID | 000002 | board ID | 000220 |
| manager ID | 000011 | board ID | 000217 |
| manager ID | 000011 | board ID | 000216 |

| | selection of board | | |
|---|---|---|---|
| Please select a board and click OK button. | group title | convenient map of Tozai-shi | |
| manager's name | board ID | title | |
| manager A | 000237 | town planning of A-machi | |
| manager A | 000236 | map of A-machi | |
| manager A | 000235 | calender of A-machi | |
| manager B | 000231 | town planning of B-machi | |
| manager B | 000223 | map of B-machi | |
| manager B | 000220 | calender of B-machi | |
| manager Taro | 000217 | town planning of Tozai-shi | |
| manager Taro | 000216 | support for parenting | |

OK   Return

2079

FIG.27 convenient map of Tozai-shi   2080

— coordinated board — ▽   2081 town planning of A-machi
map of A-machi
calender of A-machi
town planning of B-machi
map of B-machi
calender of B-machi
town planning of Tozai-shi
support for parenting

FIG.31 registration of user

| | | |
|---|---|---|
| name | Hiroko Aozora | 3050 |
| nickname | Hiro | 3051 |

○ open name to the public
⦿ open nickname to the public

| | | |
|---|---|---|
| residence | | 3052 |
| temporary password | | 3053 | contact address

| | | | |
|---|---|---|---|
| (telephone number) | | ☑ open | 3054 |
| (FAX) | | ☑ open | 3055 |
| (e-mail address) | | ☑ open | 3056 |
| a word of comment | your favor is expected | | |
| comment | ☑ open | | 3057 |
| URL | | | 3058 | boards, of which mail notice assignment is desired

☐ K-machi information map
☐ map of national delicious food pride
☐ Aozora-machi block association☆everybody's notice
☐ Teacher's NET
☐ [ inside recipe ] shrimp stew
☑ map in a region facing Aozora station
☐ classification of refuse
☐ [ recipe ] shrimp stew
☑ town planning of Tozai-shi
☑ support for parenting

3059

OK  Reset

```
<calender data>
    <calendar ID>000222</calendar ID>              1201
    <type>communitycalendar</type>                1202
    <status>2</status>          1203                              1204
    <calender registration date>2002/03/27</calender registration date>
    <calender title>Tozai calendar</calendar title>      1205
    <manager ID>000009</manager ID>         1206
    <manager's name>Taro Tozai</manager's name>    1207    1208
    <manager's mail address>tozai@tozai.go.jp</manager's mail address>
    <calender comment>think tomorrow of Tozai-shi</calender comment>
    <password>sb</password>         1210                           1209
    <card type>text</card type>        1211
    <calender update date>2002/03/27</calender update date>   1212
    <setting of color="true">
        <"word-of-mouth communication" color of icon>pink</"word-of-
        mouth communication" color of icon>
        <"sale information" color of icon>purple</"sale information" color
        of icon>
1213
        <"notice for residents" color of icon>yellow</"notice for residents"
        color of icon>
        <"notice for businessmen" color of icon>green</"notice for
        businessmen" color of icon>
    </setting of color>
    </setting of icon>
</calender data>
```

FIG.34

```
<event data>
    <event ID>000020</event ID>             ——1401
                                                          ——1402
    <registration date>2002/03/13<registration date>
    <calendar ID>000233</calendar ID> ——1403
                                                          ——1404
    <event holding date>2002/04/04</event holding date>
    <event title>personal computer lecture</event title> ——1405
    <event place>Tozai community center</event place> ——1406
    <event beginning time>9:00</event beginning time> ——1407
    <event ending time>14:00</event ending time> ——1408
    <icon genre>03</icon genre> ——1409
    <icon type>04</icon type> ——1410                     ——1411
    < event contents > A basic operation of a personal computer will be
    lectured thoroughly beginning with the elements of the operation. A
    lecture is assigned to a trainee, and so learning can be made at a
    trainee's pace without haste. A trainee will be able to operate a
    personal computer in a day. You are cordially invited to seize this
    opportunity to take lectures. </event contents>       ——1412
    <event reception>information section, municipal office of Tozai-
    shi</event reception>
    <URL of related information>http://www.tozai.yakuba.jp/pc/</URL of
    related information>                                 ——1413
    <picture image file>.bmp</picture image file> ——1414
    <update date>2002/03/13</update date> ——1415
    <update time>11:04<update time> ——1416
    <user ID> 000055</user ID> ——1417
    <user's name>Taro Aozora</user's name>  ——1418
    <telephone number>03-1234-XXXX</telephone number> ——1419
    <FAX number>03-5678-XXXX<FAX number> ——1420
    <mail address>jyo-hou@tozai.yakuba.jp</mail address> ——1421
    <application deadline date>2002/04/03 ——1422
    <application deadline time>16:00 ——1423
    <mail notice assignment is desired>true</mail notice assignment is
    desired>                                              ——1424
</event data>
```

FIG.35

```
<user data>
    <user ID>000055</user ID>  ———1501
    <update date>2002/03/03</update date> ———1502
    <password>aozora</password> ———1503
    <user's name>Hajime Aozora</user's name> ———1504
    <nickname>Hajime</nickname> ———1505
    <residence >1-1-1, Nanboku-shi, Tozai-ken </residence > ———1506
    <telephone number>03-1234-XXXX</telephone number> ———1507
    <FAX number>03-5678-XXXX</FAX number> ———1508
    <mail address>jyo-hou@tozai.yakuba.jp</mail address> ———1509
    <a word comment>town planning comfortable to live in is aimed at.
    Your favors are invited.</a word comment>                    1510
    <registration date>2002/03/03</registration date> ———1511
    <authority>user</authority> ———1512              1513
    <opening of a word comment to the public>true</opening of a word
    comment to the public>                                        1514
    <opening of name to the public>true</opening of name to the public>
    <opening of nickname to the public>false</opening of nickname to
    the public>                                                   1515
    <opening of telephone number to the public>true</opening of
    telephone number to the public>                    ———1516
    <opening of FAX number to the public>true </opening of FAX number
    to the public>                                      ———1517
    <opening of mail address to the public>true</opening of mail address
    to the public>                                      ———1518
    <URL>www.aozora.co.jp</URL> ———1519
    <setting of mail notice assignment>true</setting of mail notice
    assignment>                                         ———1520
</user data>
```

```
<mail service data>
    <user information>
    <user ID>000055</user ID>              1522
    <mail address>jyo-hou@tozai.yakuba.jp</mail address>   1523
    <mail desire board ID>000222</mail desire board ID>    1524
        <mail notice assignment settled event>000020</mail notice
        assignment settled event>                          1525
    <mail desire board ID>000190</mail desire board ID>    1526
        <mail notice assignment settled event>000010</mail notice
        assignment settled event>                          1527
    <genre type>0101</genre type>          1528
    <genre type>0102</genre type>          1529
    <genre type>0405</genre type>          1530
    <notice assignment time>pm</notice assignment time>    1531
    <notice assignment unit>week</notice assignment unit>  1532
    <user information>
</mail service data>
```

1521

FIG.38 event window list of event application terms — 3088

| No. | deadline date | holding date | event title | sponsor | contact address | | | |
|---|---|---|---|---|---|---|---|---|
| | | | | | TEL | FAX | Mail | |
| 1 | 2002/04/03 | 2002/04/04 | lecture room of personal computer | Taro Aozora | 03-1234-XXXX | 03-5678-XXXX | jyo-hou@touzai.yakuba.jp | |
| 2 | 2002/04/03 | 2002/04/04 | lecture of personal handicrafts | Hanako Ekimae | 03-1234-XXXX | 03-5678-XXXX | eki@mae.xx.jp | |
| 3 | 2002/04/05 | 2002/04/06 | lecture room of parenting | Mama Shinmai | 03-1234-XXXX | 03-5678-XXXX | shin@maimama.xx.jp | |
| 4 | 2002/04/06 | 2002/04/06 | lecture room of personal computer | Taro Aozora | 03-1234-XXXX | 03-5678-XXXX | jyo-hou@touzai.yakuba.jp | |

3089 event display screen

FIG.41

| | | |
|---|---|---|
| | event input | |
| date | 2002 ▽ year 4 ▽ month 4 ▽ day | |
| time | 9 ▽ : 00 ▽ ~ 14 ▽ : 00 ▽ | |
| title | lecture on personal computer | |
| genre | information for residents ▽ | |
| life scene | live ▽ | |
| contents | A basic operation of a personal computer will be lectured thoroughly beginning with the elements of the operation. A lecture is assigned to a trainee, and so learning can be made at a trainee's pace without haste. A trainee will be able to operate a personal computer in a day. You are cordially invited to seize this opportunity to take lectures. | |
| reception | information section, municipal office of Tozai-shi | |
| place | board room No. 3, Tozai community center | |
| map | ☑ paste link on URL  http://www.tozai.yakuba.jp  <br> : ￥map￥tozai￥komin  reference | |
| application term of event | ● set   2002 ▽ year 4 ▽ month 3 ▽ day 16 ▽ : 00 ▽ <br> ○ not set | |
| mail notice assignment to user | ● desire <br> ○ not desire | |

[ OK ]  [ Reset ]

Labels: 3098, 4005, 4001, 3099, 4000, 4002, 4003, 4004, 4007, 4006, 4008

FIG.42 registration of user

| name | | 3050 |
| nickname | | 3051 |
| ● open name to the public |
| ○ open nickname to the public |
| residence | | 3052 |
| temporary password | | 3053 |
| contact address (telephone number) | ☑ open to the public — 3054 |
| (FAX) | ☑ open to the public — 3055 |
| (e-mail address) | ☑ open to the public — 3056 |
| a word comment | | 3057 |
| comment | ☑ open to the public |
| URL | | 3058 | setting of details of mail notice assignment board, to which mail notice assignment is desired
☐ town planning of Tozai-shi
☐ map in a region facing Aozora station
☐ notice of Aozora-machi block association calender, of which mail notice assignment is desired
☐ town A calendar of Tozai-shi
☐ town B calendar of Tozai-shi
☐ calendar of C-machi block association time zone, in which mail notice assignment is desired  ☐ before noon  ☐ afternoon  ☐ night
notice assignment unit  ☐ that day  ☐ after three days  ☐ this week

| genre | | life scene |
| word-of-mouth information | (☐ play ☐ eat ☐ buy ☐ work ☐ live) |
| sale information | (☐ play ☐ eat ☐ buy ☐ work ☐ live) |
| information for residents | (☐ play ☐ eat ☐ buy ☐ work ☐ live) |
| information for businessmen | (☐ play ☐ eat ☐ buy ☐ work ☐ live) |

[OK] [Reset]

```
<board-group-information>
<boardgroup id="000021">                                    ——— 4030 coordinated group ID
<groupTitle>special edition of A-machi</groupTitle> ——— 4031 title of coordinated group
<description/>                          ——— 4032 coordinated group word comment
<boardTitle boardID="000004">plan of A-machi</boardTitle>  ⎤
<boardTitle boardID="000190">A-machi map</boardTitle>       ⎬ 4033 coordinated group board
<boardTitle boardID="000191">A-machi calendar</boardTitle> ⎦
</boardgroup>
</board-group-information>
```

METHOD FOR COMMUNICATION

BACKGROUND OF THE INVENTION

The present invention relates to a method of effecting communication in a network, to a communication system making use of the method for communication, to a program for the communication system, and to a recording medium on which the program for the communication system is recorded and which is capable of being read by a computer.

In recent years, while servicing of a network infrastructure and circulation of PC/mobile terminals have prevailed the number of people making use of a communication system on a network has been increasing. Existing communication systems include mail, mailing list, bulletin board, chat, and teleconference, and such systems are utilized to generate various communities with networks as a medium, which constitute sources of various activities.

Among these activities, a technique for eliminating a struggle against participation in a communication in a network in a community has become important. The struggle against participation in a communication in a community on a network includes:

(1) The problem of saying too much, so that it is difficult to read messages well.

(2) The thread of a conversation (thread of a plurality of subjects) is complex and difficult to understand ("Networking Community" by Kenichi Ikeda, 1997 Publishing Department of Tokyo University).

As a measure for solving the above-mentioned problems, a bulletin board system and a discussion managing method described in, for example, JP-A-9-231040 (referred to below as prior example 1). In this approach to the above-mentioned problems, a speaker selects and gives an attribute, such as assent, opposition, supplement, alternative proposal, or the like, to his message, thus hierarchically displaying a referenced relationship of articles to make the pro and con of discussions through e-mails easy.

Meanwhile, in the well known KJ method, it is proposed to use a plurality of cards to perform arrangement and analysis of information, and an idea support tool based on the KJ method has been realized. We have Investigated and studied an accumulation type communication system (page 156 to 157, proceedings of the 18th conference of Nippon Perception Scientific Association, referred to below as prior example 2), with the use of a metaphor composed of cards and boards constituting a base therefor. In this system, a board forming a base for editing, sharing and accumulation of information and cards each representative of one item of information are used, such that an attendee in a community can describe information, which he wants to relate, on a card, and sticks the card in an optional position on the board through a network.

With the prior example 1, it is possible to clearly state the relationship between a particular theme and a contributed article and the relationship between contributed articles, but it is hard to clearly state the relationship between a plurality of themes and a contributed article, the n to n relationships between a plurality of contributed articles, and the course of things.

Meanwhile, with the prior example 2, the problem in the prior example 1 can be solved by using a board, which shows prerequisite information concerning a communication, cards, and link lines among the cards and between a card/board; however, but only showing all the relevance among complex cards on the board and between card/board makes it difficult for a user to easily understand the circumstances of a communication and to search and read contents of comments, about which he is concerned. Also, with the prior example 2, accumulation of every card is possible, and so arrangement and analysis of contents of a communication are facilitated; however, it cannot be said that information required for the arrangement and analysis of the contents of a communication can be fully made use of, because information in the background of the board is not made an object of information. In a communication in an optional community on a network, since a variety of members participate in the communication at any time, it can be said that it is a great task to display the contents and progress of the communication in an understandable manner.

Also, in both the prior examples 1 and 2, the function of supporting a communication is constant at the beginning and the end, irrespective of the process of the communication. While the function of allowing communication as freely as possible in, for example, an initial stage of a communication is demanded; however, the function required in the course of a communication is varied such that the function of supporting an aggregation of discussions man advanced stage of a communication is demanded. The prior examples 1 and 2 cannot provide the function of supporting a communication in a stepwise manner according to the object and progress of the communication, and whether a communication can progress well depends upon the operation on the side of a manager. Since the operation in a field of a communication in a community on a network involves a great load, it can be said that it is an important task to provide a function of causing smooth progress of a communication to support a manager in the field of communication.

SUMMARY OF THE INVENTION

In view of the above-mentioned tasks, the present invention has a main object to provide a method of communication and a communication system, by which a function is provided to display and sum up information in such a manner as to make the contents and progress of a communication understandable and to cause smooth progress of a communication in a community on a network.

According to the present invention, the above-mentioned problem is solved by a method of communication in a communication system comprising means for effecting reception and transmission, generation, display and accumulation of premising information of a communication and information units forming the basis of the communication through a network, and means for effecting reception and transmission, generation, display and, accumulation of information units forming the contents of the communication. The method of communication effects a processing by means of one of the information units or a combination of the information units when it is instructed from a user terminal to display the contents and the procedure of the communication, or to totalize the contents of the communication, or when it is instructed from a manager terminal to provide the function of the communication corresponding to an object or stage of the communication, the processing corresponding to the instruction.

Here, information units forming the contents of the communication include cards, as an example, and information units representing premising information of a communication and a basis of the communication include boards, as an example.

Information of a board as an information unit comprises an identifier of a board and attribute information for specifying the function of a board, such as the relationship between it and the cards, as shown in FIG. 4.

Also, in order to provide a communication function corresponding to an object and stage of the communication, there is provided a template conformed to the object and stage so that a manager can select and utilize the template.

Further, the present invention has a feature, in a computer-readable recording medium, in which programs relating to the communication system are recorded, and programs.

BRIEF DESCRIPTION OF THE DRAWINGS

FIG. 3 is a diagram showing a structural example of user data according to the embodiment of the invention;

FIG. 4 is a diagram showing a structural example of board data according to the embodiment of the invention;

FIG. 5 is a diagram showing a structural example of card data according to the embodiment of the invention;

FIG. 6 is a diagram showing an example of screens, in which a history of card pasting in the embodiment of the invention is displayed;

FIG. 8 is a diagram showing an example of a card menu screen in the embodiment of the invention;

FIG. 9 is a diagram showing an example of display screens of a card link and a whole text of a comment in the embodiment of the invention;

FIG. 13 is a diagram showing an example of a gathering processing procedure in the embodiment of the invention;

FIG. 14 is a diagram showing an example of gathering result screens in the embodiment of the invention;

FIG. 19 is a diagram showing an example of representative card display screens in the embodiment of the invention;

FIG. 20 is a diagram showing an example of registration screens used in determining specifications of a board and a card;

FIG. 21 is a diagram showing an example of board management screens for creation of a section board;

FIG. 23 is a diagram showing a lower layer screen for creation of a coordinated board;

FIG. 24 is a diagram showing a lower layer screen for creation of a coordinated board;

FIG. 25 is a diagram showing a lower layer screen for creation of a coordinated board;

FIG. 26 is a diagram showing a lower layer screen for creation of a coordinated board;

FIG. 27 is a diagram showing a lower layer screen for creation of a coordinated board;

FIG. 31 is a diagram showing an example of registration screens for a user;

FIG. 33 is a diagram showing a structural example of calendar data of a community;

FIG. 34 is a diagram showing a structural example of event data of the community calendar according to the embodiment;

FIG. 35 is a diagram showing a structural example of user data for the community calendar according to the embodiment;

FIG. 36 is a diagram showing a structural example of mail service data for the community calendar according to the embodiment;

FIG. 38 is a diagram showing an event window in the community calendar according to the embodiment;

FIG. 41 is a diagram showing an input screen for the inputting of an event;

FIG. 42 is a diagram showing another example of registration screens, on which a user for the board and community board according to the embodiment is registered;

FIG. 44 is a diagram which shows an example of data in the board coordination, as illustrated in FIGS. 22 to 27, according to the embodiment.

DETAILED DESCRIPTION OF THE PREFERRED EMBODIMENTS

An explanation of an embodiment of the invention will be presented with reference to the drawings. However, it should be understood that the invention is not limited to the disclosed and illustrated embodiment.

In the exemplary embodiment, an information unit in a communication will be described with reference to a communication system on the web, the system being of a double-layered structure composed of-boards and cards. Here, a board displays information constituting a prerequisite of a communication and forms an information unit providing a base, to which cards are stuck, the card being an information unit, in which the contents of a comment and Information concerning a speaker are displayed.

In addition, while an example of a double-layered structure will be considered, a three-layered structure composed of boards, cards and tags, which are stuck to cards, may be used. Also, in the description of the embodiment, a card is considered to be square in shape and to form an information unit displaying text, but the shape of a card may be in the form of an icon, mark, or the like, provided with visibility, and the displayed contents include all multimedia data, such as a picture image, motion picture, sound, and the like. Also, the system is not limited to use of the Internet and Intranet.

Figure 1:
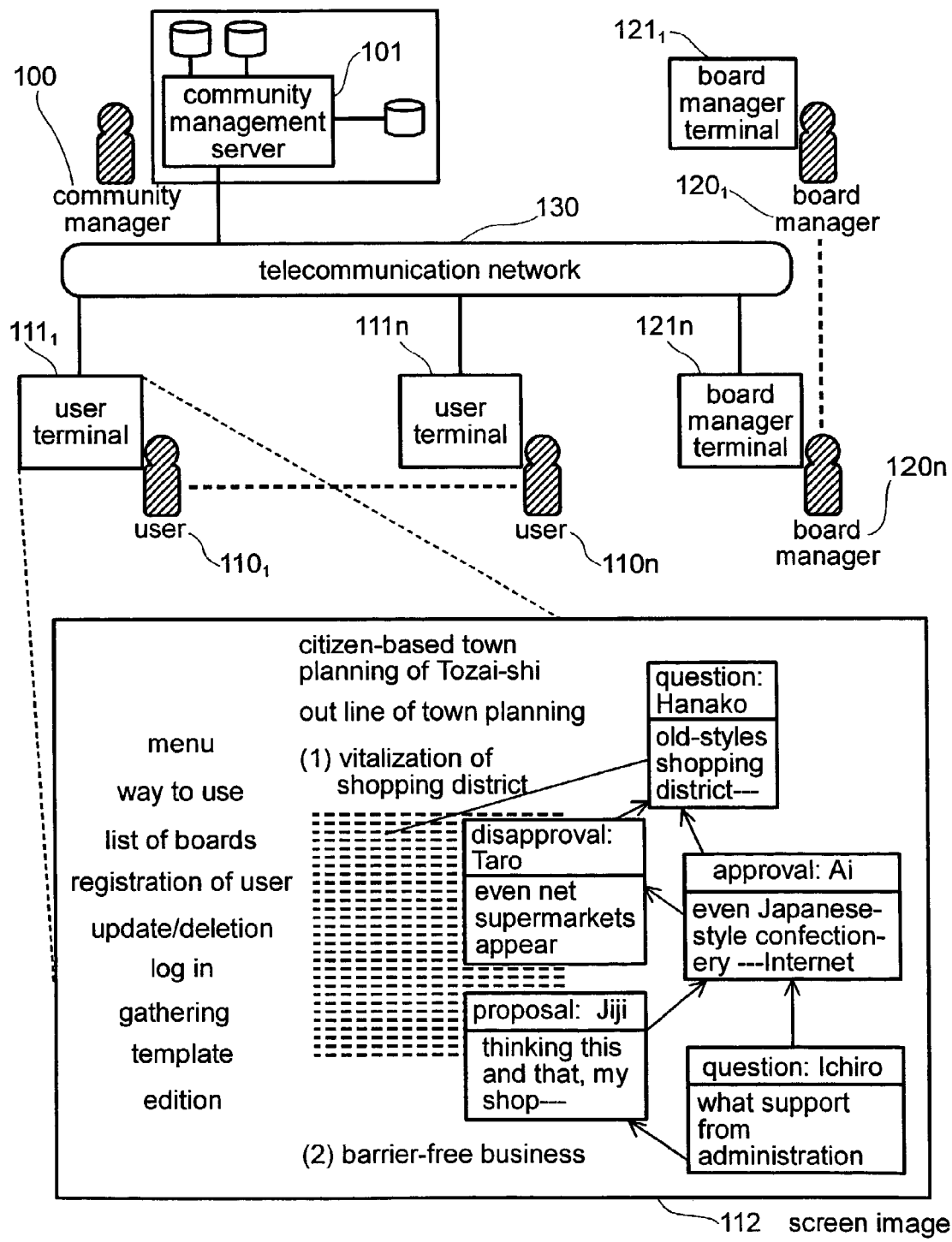
FIG. 1 is a block diagram showing a structural example of a system according to an embodiment of the invention.

FIG. 1 shows a schematic configuration of a communication system according to the embodiment. The communication system according to the embodiment is made up of a community manager 100, who manages the communication system, users $110_1$ to $110_n$ (referred to below simply as a user 110) utilizing the communication system, and board managers $120_1$ to $120_n$ (referred to below simply as a board manager 120) managing boards of the communication system constituting a field of communication in an optional community. In addition, a community represents a meeting of individuals or organizations gathering on the basis of a particular object and conditions; and, for example, a regional community indicates an aggregation of members belonging to a certain region, personnel of a self-governing body, residents, local businessmen, students, and a NPO.

As shown in FIG. 1, a community management server 101, user terminals $111_1$ to $111_n$ (referred to below simply as a user terminal 111), and board manager terminals $121_1$ to $121_n$ (referred to below simply as board manager terminal 121) are connected to one another through a telecommunication network 130, such as the Internet, Intranet and the like. In addition, a communication system sponsor different from the community manager 100 may offer a communication system to the community manager 100 with the use of a communication system management server. Also, radio transmission may be used in place of the medium of the telecommunication network 130.

The community management server 101 is managed by the manager 100 to perform generation and management of a communication. The community management server 101 performs editing and display of cards or boards in response to a demand from a user 110 and also manages card data, board data, and user data.

The user terminal-111 is used by a user 110. The user 110 uses the user terminal 111 to transmit a demand for registration of a user of the communication system, referencing, log in, editing of cards, or the like, to the community management server 101. A screen 112 in FIG. 1 is an example of a screen image obtained when a user 110 uses the user terminal 111 to utilize the communication system according to the embodiment. Here, while a menu is displayed on the left side of the server, and a board and cards are displayed on the right side of the screen, a board and cards may be displayed on the whole screen, and the menu may be displayed on a top part of the screen or on a separate screen. Here, while "list of boards" is displayed on the menu and access is made to the respective boards from the list of boards, access may be made to a board directly related from a general HTML screen.

The board manager terminal 121 is used by the board manager 120. The board manager 120 uses the board manager terminal 121 to transmit a demand for registration of a board, update and deletion of board management information, and the like, to the community management server 101. In addition, the board manager 120 maybe a user 110 at the same time and a community manager 100 at the same time.

Figure 2:
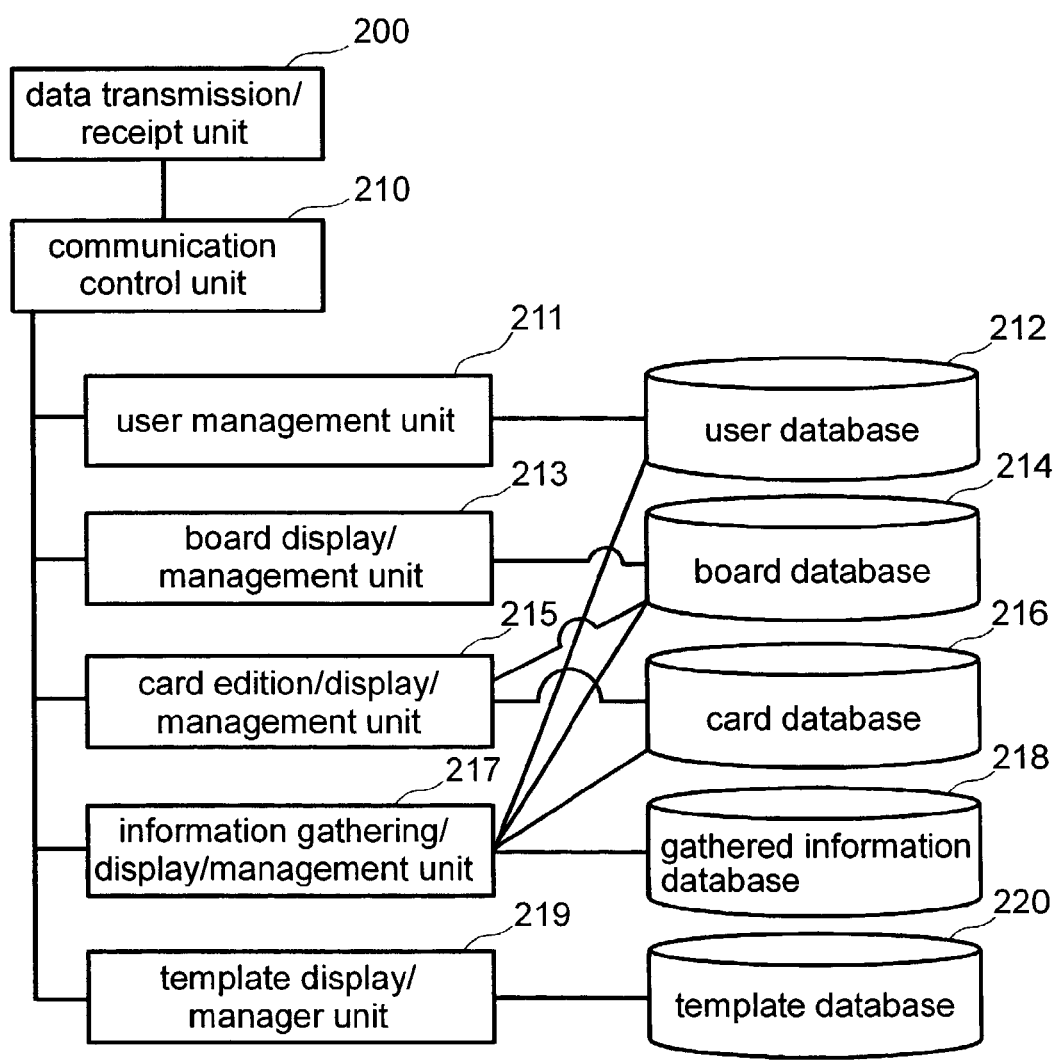
FIG. 2 is a block diagram showing a structural example of a community management serve according to the embodiment of the invention.

FIG. 2 is a block diagram of the community management server 101 in accordance with the embodiment.

A data transmission/reception unit 200 serves to receive demands from the user terminal 111 and the board manager terminal 121, to transmit the contents of a processing that meets certain demands to the user terminal 111 and the board manager terminal 121, and to perform session management at the time of log in by a user 110.

A communication control unit 210 controls the whole flow of processing of the communication system by asking an appropriate processing unit to perform a processing in response to demands transmitted from the user terminal 111 and the board manager terminal 121 via the data transmission/reception unit 200.

A user management unit 211 manages a user database 212, which stores user information, such as user IDs, passwords, or the like, to create user information to register the same in the user database 212 when a demand for registration of a user is received from a user terminal 111, and to authenticate a user ID and a password, when a demand for update or deletion of user information is received, and to update the user database 212 in the case where the user ID and the password are correct. Also, when a demand for log in is received from the user terminal 111, a user ID and a password are authenticated so as to deliver to the communication control unit 210 a message of log in OK and the user ID in the case of correct authentication and an error message in the case of incorrect authentication.

A board display/management unit 213—manages a board database 214, which stores board IDs, board titles, board manager IDs, or the like as board data, to cause the board database 214 to create a list of board titles, when a demand for display of a list of boards is made from the user terminal 111, and to deliver the same to the communication control unit 210. Also, when a demand for the referencing of an individual board is received from the user terminal 111, a board screen created by the board database 214 is delivered to the communication control unit 210. Here, when a demand for the referencing of a board, which only a specific user can reference, is made, a message, which requests input of a password known to only the specific user, is delivered to the communication control unit 210, and, when the password is transmitted from the user terminal 111, it is compared with data stored in the board database 214. In the case of correct authentication, a board screen created by the board database 214 is delivered to the communication control unit 210, and, in the case of incorrect authentication, an error message is delivered to the communication control unit 210. In addition, a member ID may be used at the time of authentication. Also, when a demand for update or deletion of board data is received from the board manager terminal 121, a user ID and a manager ID logged in from the board database 214 are compared, and a board data management screen, in the case of correct authentication, or an error message, in the case of incorrect authentication, is delivered to the communication control unit 210.

A card editing/display/management unit 215 manages a card database 216, which stores card IDs, board IDs with cards attached, user, IDs, and the like, and it operates to deliver a screen to the communication control unit 210, in which screen a card or cards from the card database 216 are displayed on a board created from the board database 214, in case a demand for comment display is made from the use terminal 111. Also, when a demand for displaying the contents of a comment is made from the user terminal 111, a screen displaying the contents of a comment created by the card database 216 is delivered to the communication control unit 210. Also, when a demand for addition of a card is made from the user terminal 111, whether a log in has been created is confirmed, and a log in screen in the case of a log in not being effected, or a comment input screen in the case of log in being effected, is delivered to the communication control unit 210. Also, when a demand for deletion of a card, addition and deletion of a link, change of a card position, and the like is made, whether log in is effected is confirmed, and a log in screen in the case of log in not being effected is delivered to the communication control unit 210. In the case of log in being effected, a user ID that is logged in is compared with a user ID in the card, and in case the authentication is correct, the procedure proceeds to respective processings, while in case the authentication is incorrect an error message is delivered to the communication control unit 210.

An information gathering/display/management unit 217 manages a gathered information database 218, which stores information of gathered results of card information and board information. When a demand for gathering of community managers 100 and board managers 120 is made, correlation of a manager ID is made, and a gathering screen in the case of correct authentication, or an error message, in the case of incorrect authentication is delivered to the communication control unit 210.

A template display/management unit 219 manages a template database 220, which stores a template database comprising a set of board backgrounds and card functions according to an object and a stage of communication. The unit delivers a template menu to the communication control unit 210 from the template database 220, when a demand for the template menu is made from the board manager terminal 121, and a board screen created by the template database 220 to the communication control unit 210, when a demand for use of a template is made.

In addition, there is a Java (R) technique serving as an assembly, technique for realizing the above processings on a Web browser. "JAVAPRESS Vol. 14" (published by Gijutsu Hyoron-sha in October, 2000, pages 38 to 43) describes Servlet, JSP, and the like, as a server side JAVA®, and a combination of them makes it possible to create various Web pages dynamically. Also, an event control and a pulldown menu display on a Web screen are generally assembled by means of a JAVA® applet. While the user database 212, board database 214, card database 216, gathered information database 218, and the template database 220 are means for recording respective data, they may be means for recording data in the form of a file and a folder.

FIG. 3 is a view showing a structural example of user data stored in the user database 212 in accordance with the embodiment. User data 300 represents data required for management of users and display of information about speakers in a tag form. Information interposed between user ID tags represents user ID301, and information interposed between password tags represents password 302. User ID301 and password 302 are data input at the time of log in and required for authenticating whether a speaker is the principal when a demand for deletion of a card, addition and deletion of a link, change of a card position, and the like is made.

Also, while information regarding a speaker on a card can be Said to be helpful in understanding the contents of a card, disclosure of a speaker s information requires a speakers consent. An example of speakers information is speaker information 303. When a user 110 registers a word comment, such as a name, nickname, residence, mail address, self-introduction, or the like, as speaker information, it is optional whether the speaker information 303 should be disclosed and displayed together with the contents, of a card. As shown in the speaker information 303, information interposed between open tags of word comment, name, nickname and mail address represents open approval and disapproval information, and true is disclosed and false is not disclosed. In addition, the embodiment adopts the case where a rule is established to make a nickname open, and a users name which is open is stored as card data, as shown in FIG. 5, to be described later.

FIG. 4 is a view showing a structural example of board data 400 of the type stored in the board database 214 in accordance with the embodiment. The board data 400 represents data required for management of boards and display of boards in a tag form, and it is registered when the board manager 120 installs a board. Information interposed between board ID tags represents a board ID401 and specifies a board, on which a card is pasted, as shown in FIG. 5, to be described later. Information interposed between board title tags represents a board title 402, and information interposed between board comment tags represents a board comment 404, such as an introduction statement for a board, or the like, presented by the board manager 120, to be used in a screen of a list of boards. Information interposed between manager ID tags represents a manager ID403 to be used as authentication at the time of update and deletion of board data. Information interposed between board picture image file name tags represents a board picture image file 405, for example, a JPEG file, constituting a background of a board. Information interposed between tags, such as the position of a picture image in a board region, the length and width of a board size, or the like, represents picture image size information 406. In addition, the board manager 120 sets a status 407 in the case where it is desired to open a board to a specific user 110. As indicated by the status 407, information interposed, between status tags represents open approval and disapproval information, such that 1 indicates an option of open and 2 indicates an option of opening a board to a specific user 110. Also, card classification information 408 is used for setting of cards used in aboard, and includes size and font of letters represented on cards. Information interposed between card type tags represents a card type 409 used to set a kind of card used in an associated board. For example, an image 412 represents the function of enabling the pasting of a picture image on a card, a vote 413 represents the function of enabling the addition of a voting button representative of approval or disapproval or not understandable to a comment whole text display region 910, a genre 414 represents the function of enabling the display a genre of a card, and a color 415 represents the function of enabling the selection of a color of a card. Also, board picture image information 410 is used at the time of card or board gathering to represent structural information of a board picture image. Also, information interposed between board type tags represents a board type 411 used in setting a kind of card. For example, a board type is selected in such a manner as to set a board, in which a picture image is displayed on a board background and communication is enabled on the board background, such as a community board, and a board, in which cards thereon can be displayed in a chronological order, such as a community calendar.

FIG. 5 is a view showing a structural example of card data 500 of the type stored in the card database 216 in accordance with the embodiment. The card data 500 describes data required for editing, display and management of cards in a tag form. Information interposed between card ID tags represents a card ID501 and specifies a card. Information interposed between board ID tags represents a board ID502 and specifies a board, on which a card is pasted, corresponding to the board ID401 of the board data 400. Information interposed between comment content tags represents comment contents 503, and a whole text of the comment contents 503 is displayed on a comment whole text display screen. Card position information 504 indicates a position of a card on a board with the use of a card position X coordinate tag and a card position Y coordinate tag. Information interposed between user ID tags specifies a card publisher by means of a user ID 505 corresponding to the user ID 301 in the user data 300. Link information 506 indicates a card ID in a linkage by means of information interposed between link card IDs. In the case where there are plural link lines, a plurality of link ID tags are set. Information interposed between link background position tags is link background position information 507. The embodiment is directed to the case of a card in which no link line is pasted on a board background picture image, and so no link background position information 507 is displayed. In the case where a link line or lines are pasted on a board background picture image, link background position information 507 specifies a position of a background picture image for linkage by means of XY coordinates. Information interposed between image tags is image information 508. The embodiment is directed to the case where no picture image is annexed, and so no image information 508 is displayed. In the case where annexing of a picture image is selected and a picture image is annexed to a card in the image 412 shown in FIG. 4, image information 508 specifies an annex file by means of a picture image file name. Information interposed between vote tags is vote information 509. In the embodiment, cases are considered where log in is effected with an individual ID and with a guest. Vote information 509 displays respective votes of approval, disapproval and not understandable by means of IDs in the case of log in with individual IDs and the number of votes in the case of log in with guests. Information interposed between genre tags is genre information 510. Genre information 510 specifies a genre name selected from genres set in the genre 414. Information interposed between color tags is color information 511. A name of a color selected from colors set in the color 415 is specified.

FIG. 6 is a view showing an example of screens, in which the progress of a communication in accordance with the embodiment is displayed. While the relationships between cards, and between cards and boards, are hard to understand even when displayed on a board as a whole, FIG. 6 shows an example of transitions of a screen displaying a history of card pasting, which provides one of solution. When the right-hand icon of a history display icon 602 is clicked on a history display screen 601, a history display screen 603 is displayed. Thereafter, by successively clicking the right-hand icon of the history display icon 602, the screen sequentially makes a transition up to a history display screen 604, on which all cards as pasted are displayed. Also, by clicking the left-hand icon of the history display icon 602, the screen makes a transition from the history display screen 604 to the history display screen 601. Link lines connecting cards together are configured such that an arrow at a tip end of the line is directed to an existing card, on which a card pasted by a user 110 is believed to be related, so as to make it possible to judge the progress of a communication at a glance. Therefore, the user 110 can put a complex situation of the communication in order while following cards and the pasting order of link lines, so that it is easy to search a card, for example, a card on which link lines gather, constituting a center of the communication. In addition, the history display icon 602 for operation of the screen transition history may be displayed at all times, as shown in FIG. 6, or the background on the history display screens 601 to 604 may be clicked to display a history display menu. While not shown in FIG. 6, a history display screen, on which no card is displayed, appears when the left-hand Icon of the history display icon 602 is clicked in a state in which the history display screen 601 is displayed. The history display screen in this state comes to a state, in which only a single information unit being a board is displayed.

Figure 7:
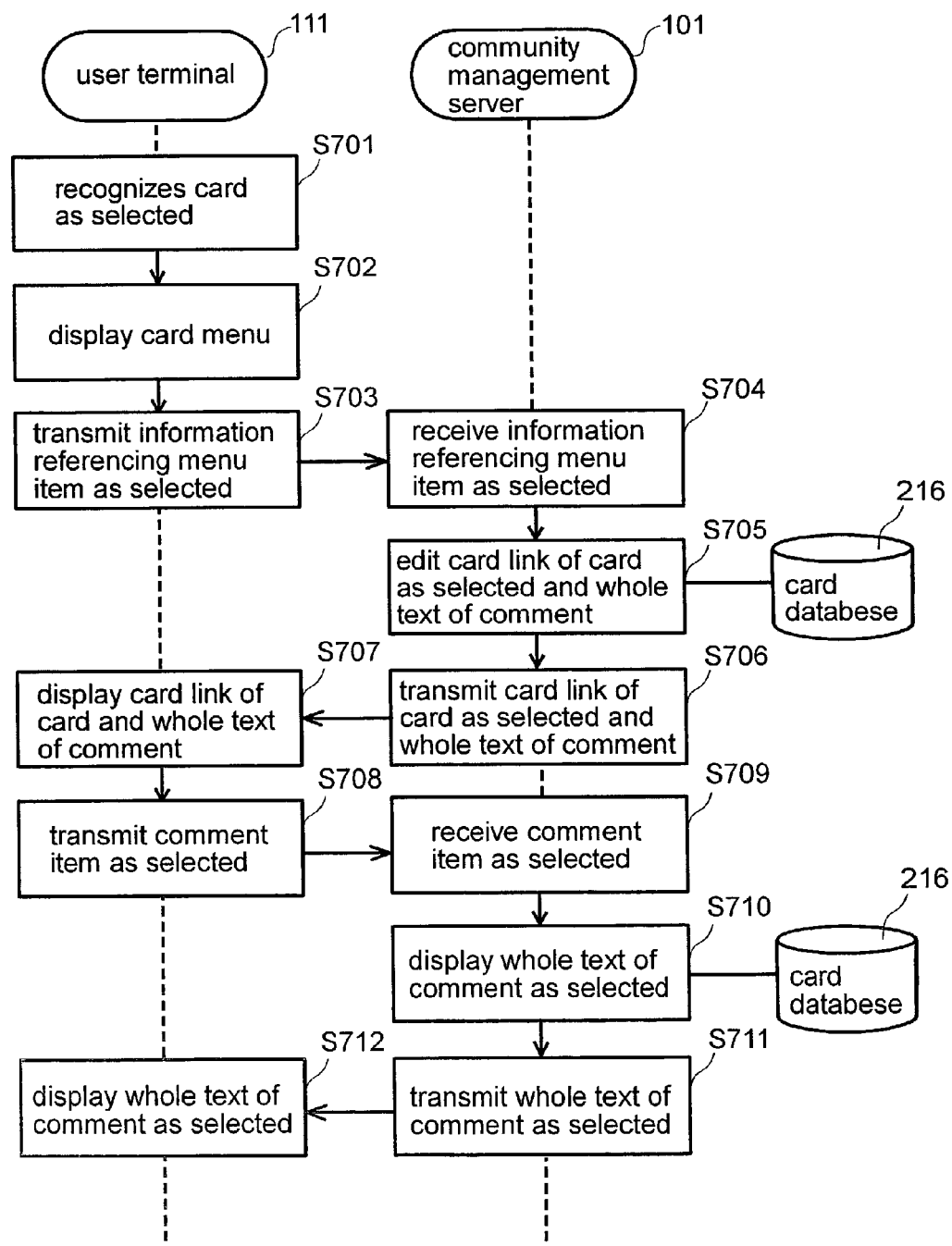
FIG. 7 is a flowchart showing an example of an information referencing processing procedure associated with cards in the embodiment of the invention.

FIG. 7 shows an example of an information referencing flowchart in the case of referencing the situation of a communication centering on a card, as selected in accordance with the embodiment. The user terminal 111 recognizes a card selected by a user 110 (STEP S701), and displays a card menu on the recognized card (STEP S702). In addition, FIG. 8, to be described later, shows an example of a screen image of the card menu. When an information referencing menu item selected by the user 110 is transmitted to the community management server 101 from the user terminal 111 (STEP S703, STEP S704), the card editing/display/management unit 215 in the community management server 101 creates a display screen of a card link and a whole text of a comment (STEP S705) from the card database 216 and delivers the data to the communication control unit 210, which data is transmitted to the user terminal 111 by the data transmission/reception unit 200 (STEP S706). The user terminal 111 receives and displays the display screen of a card link and a whole text of a comment (STEP S707). In addition, FIG. 9, to be described later, shows an example of the display screen of a card link and a whole text of a comment. Also, a comment selected in the card link by the user 110 is transmitted to the community management server 101 from the user terminal 111 (STEP S708, STEP S709). The card editing/display/management unit 215 in the community management server 101 displays a whole text of the comment selected by way of the card database 216 (STEP S710) and delivers the data to the communication control unit 210, which data is transmitted to the user terminal 111 by the data transmission/reception unit 200 (STEP S711), and the user terminal 111 displays a whole text of the selected comment in a comment whole-text display region 910, as shown in FIG. 9.

FIG. 8 is a view showing an example of a card menu screen in accordance with the embodiment. A card menu screen 800 is displayed when the user 110 clicks a card. The selection "See contents of comment" 801 is an example of information referencing menu items. When the user 110 selects the item, selection of the information referencing a menu item is transmitted to the community management server 101 from the user terminal 111, and the card editing/display/management unit 215 creates a display screen of a card link and a whole text of a comment from the card database 216 and delivers the data to the communication control unit 210, which data is transmitted to the user terminal 111 by the data transmission/reception unit 200.

Figure 11:
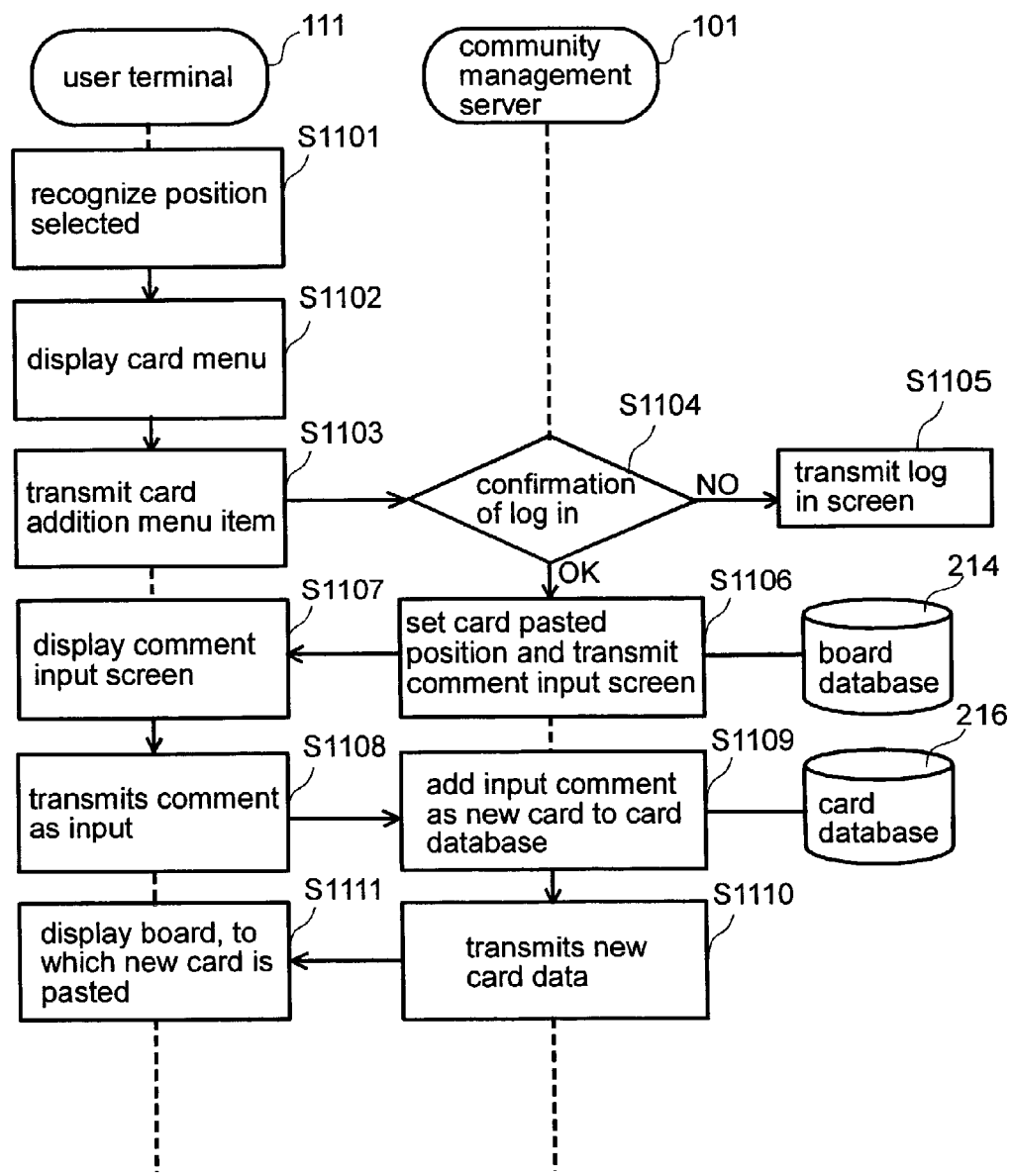
FIG. 11 is a flowchart showing an example of a card addition processing procedure in the embodiment of the invention.

In FIG. 8, the selection "addition of comment" is an example of information addition menu items 802. FIG. 11, to be described later, shows an information addition flowchart, in which a card or cards are added to a board. The selection "Deletion of comment" is an example of information deletion menu items 803. When a user 110 selects this item, selection of information deletion menu items 803 is transmitted to the community management server 101 from the user terminal 111, and in the case where the user 110 has completed log in, the user management unit 211 compares a user ID 505 of the card (see FIG. 5) with a user ID in a session information at the time of log in, which is managed by the data transmission/reception unit 200, to delete the card in the case of agreement and to display an error message "not allowed to make access to this comment" in the case of disagreement.

Also, an error display is produced in the case where the user 110 has not effected log in. In addition, when the user 110 selects the information deletion menu items 803, a confirmation message "May this card be deleted?" may be displayed.

The selection "Addition of link line" is an example of link line deletion menu items 805. When the user 110 selects this item, a link line, with the card being a link origination, is displayed on a board.

When the user 110 effects log in to select a link destination of a card, a user ID of the user 110 and position information of the selected link destination are transmitted to the community management server 101 from the user terminal 111, and the user management unit 211 compares a user ID505 of the card with a user ID in the session information at the time of login, which is managed by the data transmission/reception unit 200. In the case where agreement is recognized as a result of the comparison, link information 506 in the case of a link destination being a card or link background position information 507 in the case of a link destination being board background information is added as a card file 500 of the card database 216 or a new card file 500 of the card database 216 by the card editing/display/management unit 215, and the added link line is displayed on the board (see FIG. 5). Also, in the case where the user 110 has not effected log in or the user ID505 of the card is not in agreement with the user ID301 of the user 110 in the user database 212, an error display, such as "not allowed to make access to this comment", is produced.

The selection "Deletion of link line" is an example of the link line deletion menu items 805. When the user 110 selects this item and selects a link destination of a link line, which he wants to delete, selection of the link line deletion menu items 805 and link destination information of the link line are transmitted to the community management server 101 from the user terminal 111; and, in the case where the user 110 has effected log in the user management unit 211 compares the user ID505 of the card with the user ID in the session information at the time of log in, which is managed by the data transmission/reception unit 200, to delete the link line in the case of agreement. In the case of disagreement and in the case where the user 110 has not effected log in an error display "not allowed to make access to this comment" is made.

The selection "Changing of position" is an example of card position changing menu items 806. When the user 110 selects this item and moves the card to a position to which it is desired to be moved, selection of the card position changing menu items 806 and information of a position to which the card is to be moved are transmitted to the community management server 101 from the user terminal 111; and, in the case where the user 110 has effected log in, the user management unit 211 compares the user ID505 of the card with the user ID in a session information at the time of log in, which is managed by the data transmission/reception unit 200, to move the card to a destination of movement on the board for display in the case of agreement. In the case of disagreement and in the case where the user 110 has not effected log in, an error display "not allowed to make access to this comment" is made.

In addition, as a way to move a card, a card desired to be moved may be moved to a position to which the card is desired to be moved, by way of drag & paste operations, or after, a card desired to be moved is clicked, a position to which the card is desired to be moved may be clicked to specify the position (position on XY coordinates) of the destination of movement. Also, at the time of displaying a card on a destination of movement, the card position information 504 of the card data 500 may be changed to position information of the destination of movement or newest card position information may be-added to the card position information 504.

FIG. 9 is a view showing an example of display screens of card links and whole texts of comment in accordance with the embodiment. The screen is composed of a card link display region 900 and a comment whole-text display region 910. The card link display region 900 is one in which the relationship between a certain card and boards, and between the card and other cards, is displayed. When a card is selected, the relationship between the card and boards is displayed by a board title 901 indicative of a title of a board, on which, for example, the selected card 904 is pasted, and a board screen title 902 indicative of a position on a board screen on which the card is pasted. Also, the selected card 904 and a group of cards directly related to the selected card 904, such as a card 903 being a link destination indicative of a card, with which the selected card 904 is linked, and a card 905 being a link origination indicative of a card, with which the selected card 904 is linked, are displayed so as to be understandable at a glance. In addition, while FIG. 9 displays only cards with which the selected card 904 is directly linked, cards indirectly linked may be also included. Also, the board title 901 and the board screen title 902 may be displayed as needed. Also, while FIG. 9 displays a link destination card 903, the selected card 904 and the link origination card 905 in a first portion of contents of a comment, titles maybe displayed in the case where titles are set in comment data. Also, while FIG. 9 displays the selected card in a thick frame so as to make the same understandable at a glance, the selected card 904 may be displayed in a different color. Also, the selected card 904 need not be stationary, but the link destination card 903 may become the selected card 904 to display a link destination card and a link origination card of the link destination card 903 when the link destination card 903 is clicked. In addition, a whole text of a comment may be externally output so that whole texts of all comments can be list displayed.

Figure 10:
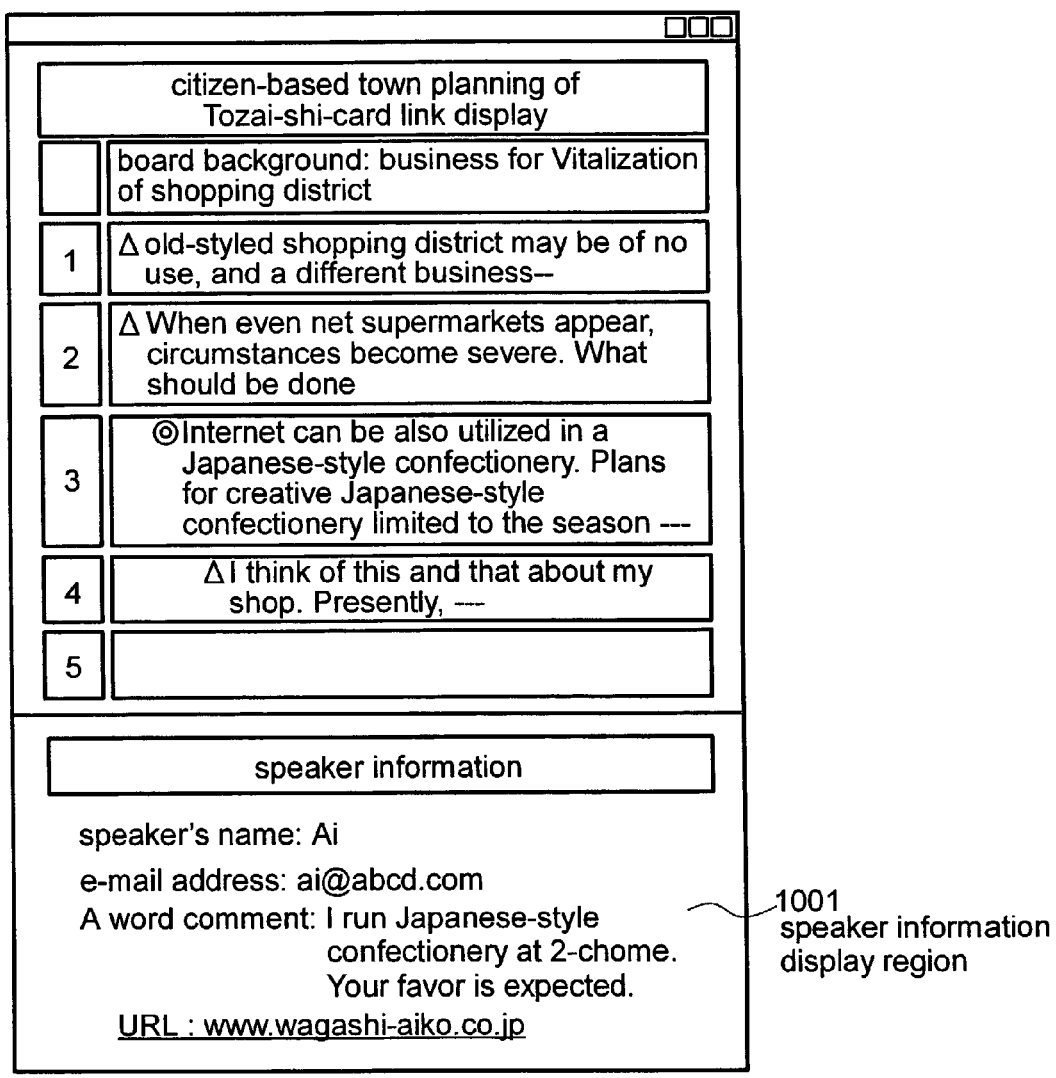
FIG. 10 is a diagram showing an example of speaker information screens in the embodiment of the invention.

A comment whole-text display region 910 is one in which a whole text of the comment contents 503 is displayed. For example, a whole text of a comment 911 and statement information 912, such as the speaker's name and the date of the statement, are displayed. In addition, speaker information, as shown in FIG. 10, to be described later, may be displayed when the speakers name is clicked. Also, while FIG. 9 displays the card link display region 900 and the comment whole-text display region 910 on the same screen, the regions may be displayed on separate screens. A function of voting 913 is an example of vote function display screens of a card, in which a vote function, such as the vote information 509 shown in FIG. 5, is set. When a user 110 selects a vote button, such as approval, disapproval or the like, a user ID of the user 110 and Information of the selected vote button are transmitted to the community management server 101 from the user terminal 111 in the case where the user 110 has effected login. The card editing/display/management unit 215 compares the vote information 509 of the card database 216 with the user ID, and in the case of disagreement, adds the user ID to the vote information 509 to increase and display one count below, a vote button selected in the function of voting 913. In the case of agreement, no count in the function of voting 913 is increased. With such a method, one person is prevented from making several votes on the same comment. In addition, a vote may be made on one card on the same board.

FIG. 10 is a view showing an example of display screens of speaker information in accordance with the embodiment. For example, the comment whole-text display region 910 may be switched over to a speaker information display region 1001, as shown in FIG. 10, when a speakers name in the comment whole-text display region 910 is clicked. Also, speaker information may be displayed on a separate screen.

FIG. 11 is a flowchart showing an example of information delivery flows in the case where a card is added on a screen on a board in accordance with the embodiment.

When the user terminal 111 recognizes a position selected by a user 110 (STEP S1101), a card menu 800 is displayed in the case where the selected position is a card (STEP S1102). Also, in the case where the selected position is a board background, a menu composed of only, a card menu item, such as "add a card", is displayed (STEP S1102). When the user terminal 111 transmits a card addition menu item selected by the user 110 (STEP S1103), the user management unit 211 is started up in the community management server 101 to transmit a log in screen to the user terminal 111 (STEP S1105) in the case where the user 110 has not effected log in (STEP S1104). In the case where the user 110 has effected log in (STEP S1104), the card editing/display/management unit 215 sets a position on a board associated with the added card on the basis of a position selected in STEP S1101 and transmits to the user terminal 111 a comment input screen created by the board database 214 (STEP S1106), and the user terminal 111 displays the comment input screen as transmitted (STEP S1107). When the user terminal 111 recognizes a registration button selected by the user 110 and transmits a comment as input (STEP S1108), the community management server 101 adds a comment, which the card editing/display/management unit 215 has received, to the card database 216 as new card data (STEP S1109) and transmits the new card data to the user terminal 111 (STEP S1110). Having received the new card data, the user terminal 111 pastes the new card on a board and displays the same (STEP S1111). In addition, transmission of an input comment to the community management server 101 and registration into the card database 216 may be effected after the user terminal 111 has pasted the new card on a board and displayed the same.

Figure 12:
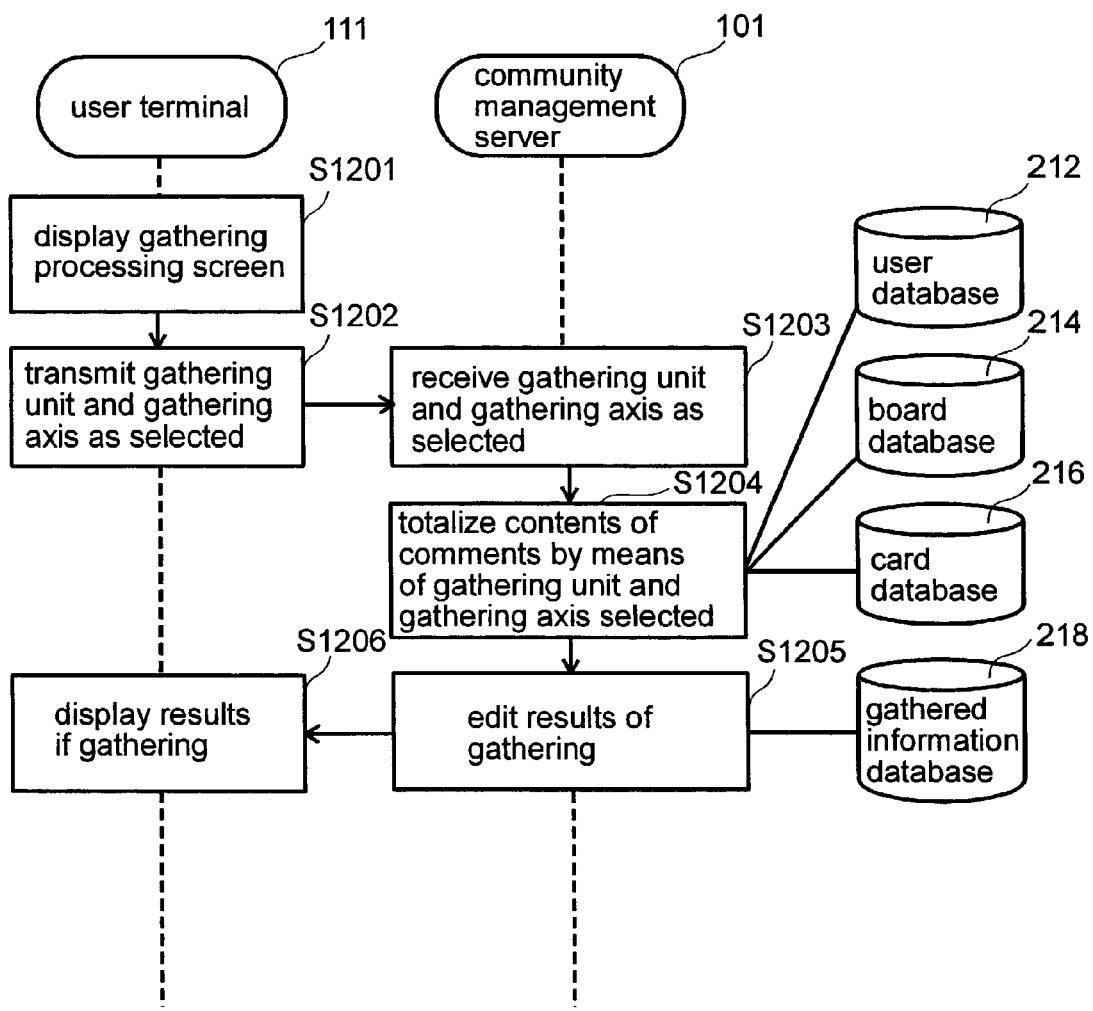
FIG. 12 is a flowchart showing an example of a gathering processing procedure in the case where the contents of a communication are accumulated in the embodiment of the invention.

FIG. 12 is a view showing an example of a gathering processing flowchart in the case where the contents of a communication are accumulated by means of a combination of cards and a board in accordance with the embodiment. The user terminal 111 displays a gathering processing screen (STEP S1201) and transmits to the community management server 101 a gathering unit and a gathering axis selected by the user 110 (STEP S1202, STEP S1203). FIG. 13, to be described later, shows an example of gathering processing screens Having received information of a gathering unit and a gathering axis, the information gathering/display/management unit 217 in the community management server 101 performs gathering on the basis of information of the gathering unit and the gathering axis, as selected with the use of the speaker information 303 in the user database 212, the board picture image information 410 in the board database 214, the card position information 504 in the card database 216, and the like (STEP S1204). Subsequently, the information gathering/display/management unit 217 stores the results of gathering in the gathered information database 218 and then transmits the same to the user terminal 111 (STEP S1205), and the user terminal 111 displays the results of gathering (STEP S1206). FIG. 14, to be described later, shows an example of gathering result screens.

FIG. 13 shows an example of gathering processing screens in accordance with the embodiment. A user 110 sets a gathering unit 1302 and a gathering axis 1303 shown in, for example, FIG. 13, in a gathering processing input region 1301. The gathering unit 1302 means an Information, unit of an object, such as cards, boards, or the like, being totalized, and sets an indication of which information unit should be used for a gathering unit, or which combination of information units should be used. The gathering axis 1303 includes gathering axes, such as a board gathering axis 1304, card gathering axis 1305, or the like, for every information unit. The board gathering axis 1304 is associated with the board picture image information 410 representative of XY information of a board picture image structure. While FIG. 13 shows the case where a board picture image selects "chapter and paragraph" as an example of documents, selection items, such as "table item" in the case where a board picture image is a matrix, "position information" in the case where a board picture image is a map, are possible. The card gathering axis 1305 is associated with information in the card data 500. While FIG. 13 shows the case where keywords and attribute information of a speaker constitute selection items, update date information, link information, or the like may be used.

FIG. 14 is a view showing an example of gathering result screens in accordance with the embodiment. A gathering result 1402 and comment contents 1403 contained in the gathering result are displayed in a gathering result display region 1401 on the basis of the gathering processing input information, as shown in FIG. 13. While FIG. 14 shows an example of gathering results in the case of setting, as shown in FIG. 13, the gathering results may be displayed in a graph or on a board background.

Figure 15:
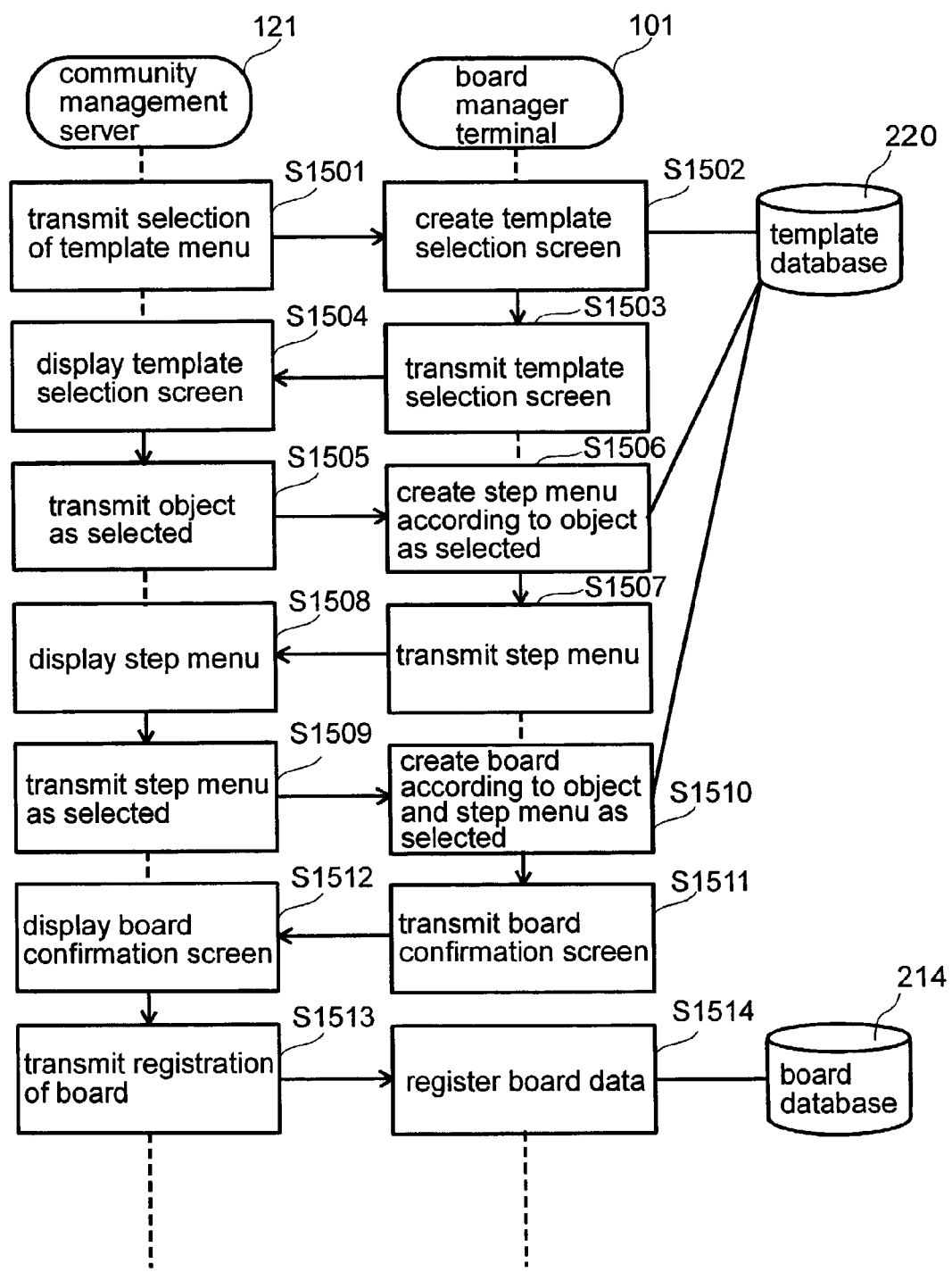
FIG. 15 is a flowchart showing a template setting processing procedure in the embodiment of the invention.

FIG. 15 shows an example of a flowchart, in which a combination (referred below to as template) of a card and a board providing a communication function conformed to an object and a stage of a communication in accordance with the embodiment is set. When the board manager terminal 121 transmits selection of a template menu produced by the board manager 120 to the community management server 101 (STEP S1501), the template display/management unit 219 in the community management server 101 creates a template selection screen through the template database 220 and transmits the same (STEP S1502, STEP S1503).

Figure 16:
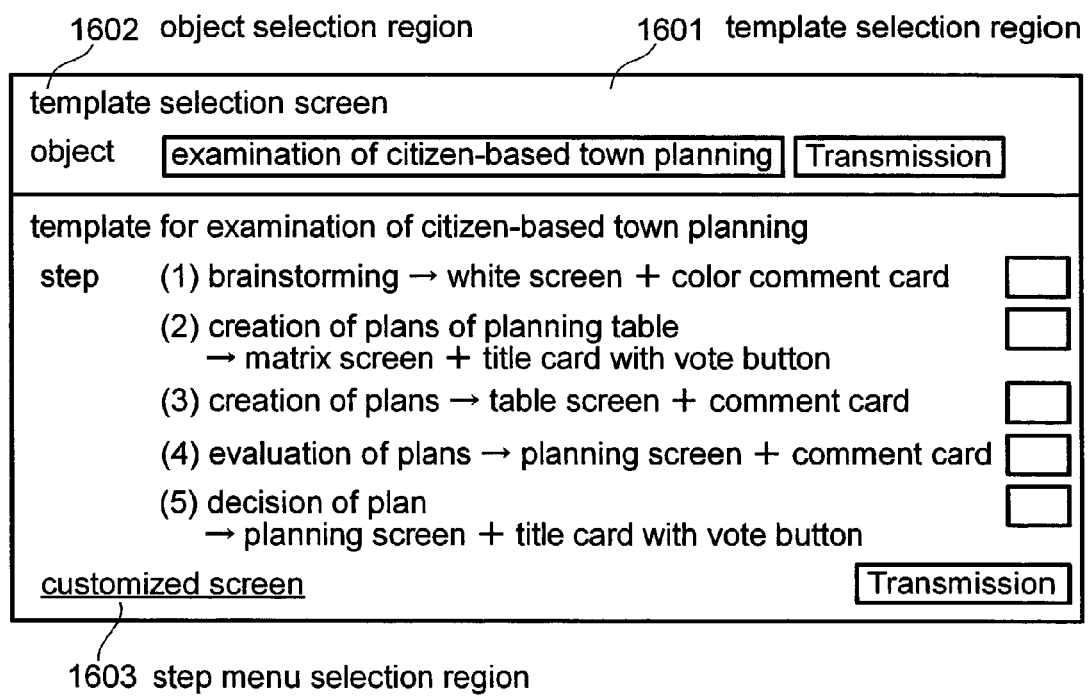
FIG. 16 is a diagram showing an example of template selection screens in the embodiment of the invention.

When the board manager terminal 121 displays a template selection screen as received (STEP S1504) and transmits an object selected by the board manager 120 (STEP S1505), the template display/management unit 219 in the community-management server 101 creates a step menu through the template database 220 according to the object transmitted from the board manager terminal 121 and transmits the same to the board manager terminal 121 (STEP S1506, STEP S1507). FIG. 16, to be described later, shows an example of template selection screens. When the board manager terminal 121 displays a step menu as transmitted (STEP S1508) and transmits a step menu Item selected by the board manager 120 to the community management server 101 (STEP S1509), the template display/management unit 219 in the community management server 101 creates a board through the template database 220 according to the object and step menu item as selected (STEP S1510) and transmits a board confirmation screen to the board manager terminal 121 (STEP S1511). The board manager terminal 121 displays the board confirmation screen (STEP S1512) and transmits a board registration information input by the board manager 120 and a demand for board registration, as selected to the community management server 101 (STEP S1513), and the board display/management unit 213 in the community management server 101 registers the board information in the board database 214 (STEP S1514).

FIG. 16 shows an example of template selection screens in accordance with the embodiment. A template selection region 1601 is composed of an object selection region 1602, in which an object of a communication is selected, and a step menu selection region 1603, in which a step in a communication is selected. The step menu selection region 1603 displays a step menu corresponding to an object selected in the object selection region 1602. FIG. 16 shows an example in the case where an object "examination of citizen-based town planning" is selected. Also, the template database 220 stores the board picture image file 405 and the card classification information 408, which are selected in the selection menu in the object selection region 1602, and the selection menu and step menu in the step menu selection region 1603. In addition, a customized screen may be set to enable the board manager 120 to customize a template on the basis of a step menu.

Figure 17:
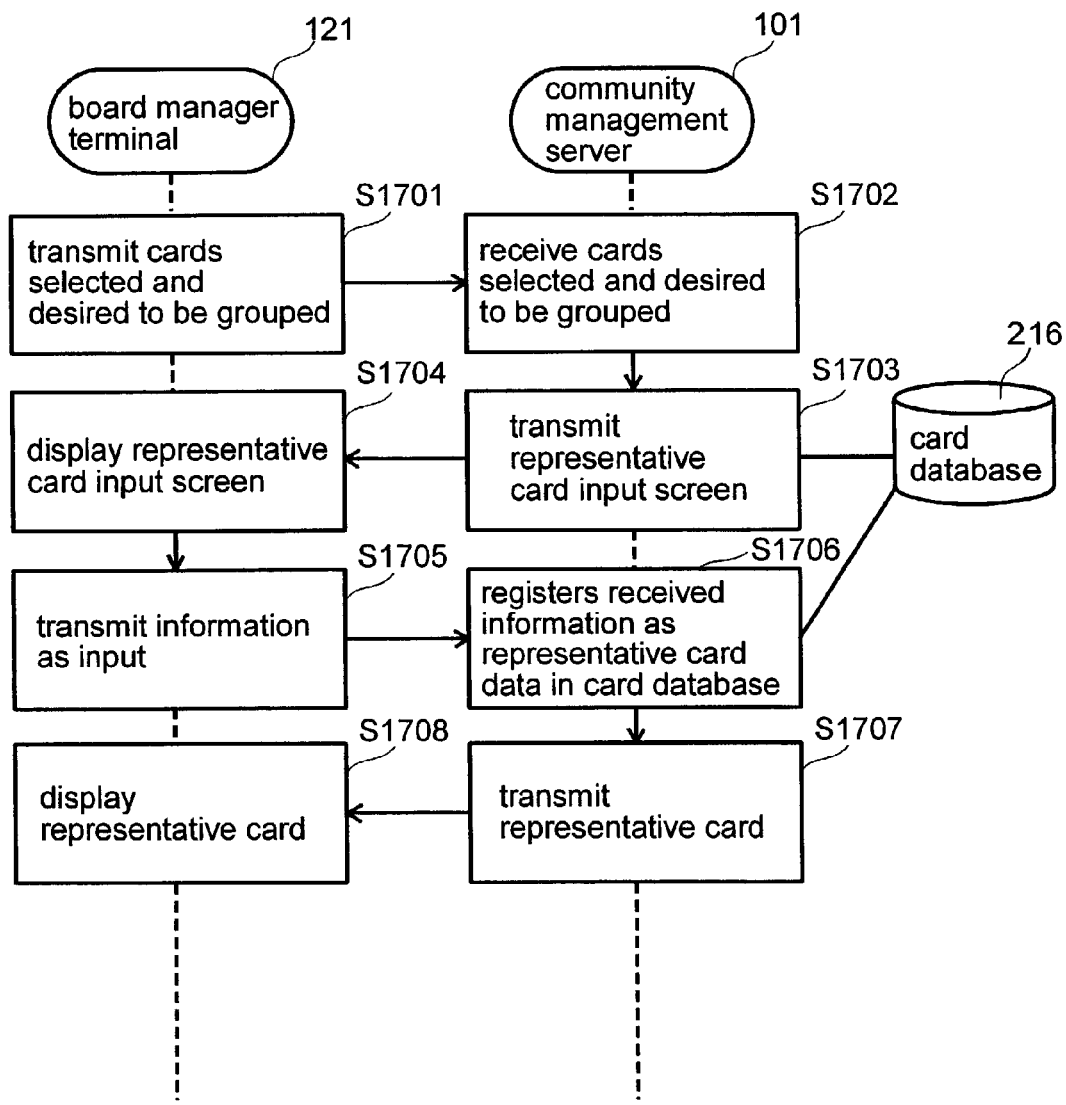
FIG. 17 is a flowchart showing a grouping setting processing procedure of the cards in the embodiment of the invention.

FIG. 17 shows an example of processing flowcharts in the Case where a plurality of cards are grouped in the embodiment. It is useful to group a plurality of related cards as a function of displaying the contents of a communication for better understanding. FIG. 17 shows a processing flowchart in the case where the board manager 120 coordinates cards on a management object board to create a representative card. When cards, which are selected by the board manager 120 and are to be grouped, are transmitted to the community management server 101 by the board manager terminal 121, the card editing/display/management unit 215 in the community management server 101 transmits a representative card input screen to the board manager terminal 121 (STEP S1701, STEP S1702, STEP S1703). The board manager terminal 121 displays the representative card input screen and transmits information, such as a comment Input by the board manager 120, to the community management server 101 (STEP S1704, STEP S1705) The community management server 101 registers the received information as representative card data in the card database 216, and then transmits the created representative card to the board manager terminal 121, which in turn displays the representative card (STEP S1706, STEP S1707, STEP S1708).

Figure 18:
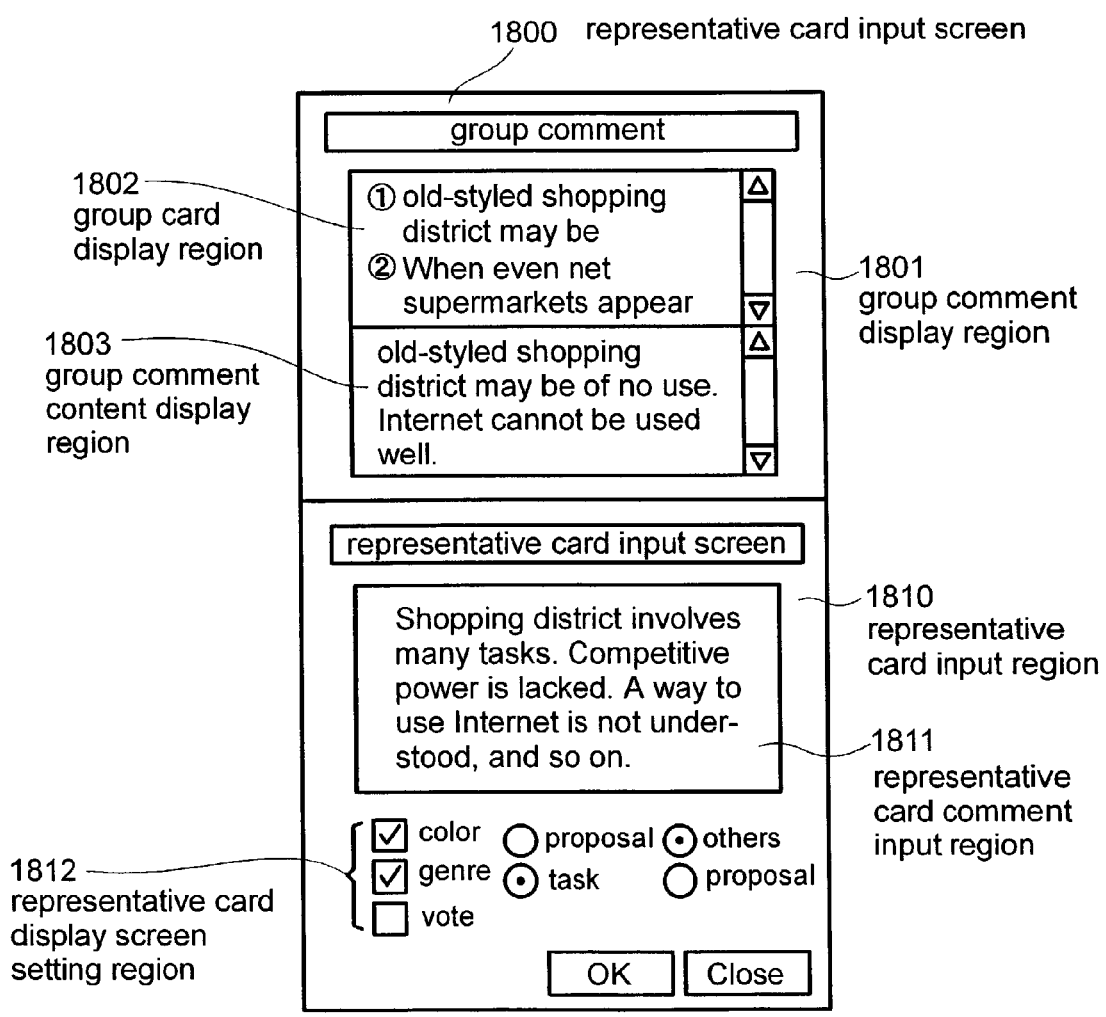
FIG. 18 is a diagram showing an example of representative card input screens in the embodiment of the invention.

FIG. 18 shows an example of representative card input screens in accordance with the embodiment. A representative card input screen 1800 is composed of a group comment display region 1801 and a representative card input region 1810. The group comment display, region 1801 includes a group card display region 1802 displaying headers of plural cards that are to be grouped, and a group comment display region 1803 displaying comment contents of cards selected in the group card display region 1802. Also, the representative card input region 1810 includes a representative card comment input region 1811, in which a comment of a representative card is input, and a representative card display screen setting region 1812, in which a way to display the color and genre of a representative card is set.

FIG. 19 shows an example of representative card display screens in accordance with the embodiment. A fundamental card display screen image 1900 is a screen image that exists prior to creation of a representative card, and a representative card display screen image 1901 is a screen image that exists after cards in the fundamental card display screen image 1900 are coordinated to create a representative card. In order to better understand at a glance that a representative card is different from other cards, a representative card and other cards may be made different in size and color from each other, as in the representative card display screen image 1901. Also, cards being grouped may be better understood at a glance by displaying cards that are grouped behind a representative card in an overlapping manner. A representative card 1902 is composed of a card type icon 1903, such as a "flag" icon representative of a representative card, the card type icon being representative of a card type, a card data display region 1904 representative of the genre of card contents and a speaker, and a comment display region 1905 representative of card contents. In addition, in the case where it is desired to display a whole text of a comment in a representative card, the card menu 800, as shown in FIG. 8, is used. Also, a screen representative of the contents of a representative card is a display screen, as shown in FIG. 9, to display the group comment display region 1801, as shown in FIG. 18, in place of the card link display region 900. In addition, cards other than a representative card are also displayed in a configuration composed of a card type icon 1903, a card data display region 1904, and a comment display region 1905, so that the kinds of cards may be discriminated only by the card type icon 1903.

FIG. 20 shows an example of board registration screens of the board manager 120 used in determining a board and specifications of the card. A board registration screen 2001 is stored in the board database 214 and is called from the board database 21,4 by the board manager terminal 121. Provided on the left side of the board registration screen 2001 are various setting items, such as "board type", "board title", "a word comment", "board size (width)", "board size (height)", "number of letters of a comment displayed in a line", "font size of card", "font size of comment input/display", "selection of function of card", "manager ID", "manager's name", "mail address of manager", "setting of members", "password", "display position of background picture image", "file name of background picture image", or the like, and provided on the right side of the respective items are input boxes for inputting of registered matters, and check boxes.

In FIG. 20, when a selection button 2003 in a selection box 2002 adjacent the item "board type" is clicked, a community board, a private board, and the like are displayed in a pull-down menu. Here, the board type 411 in the board data 400 depicted in FIG. 4 is selected, and thus a community board is selected. When letters are input into an input box 2004 displayed adjacent the item "board title", letters are registered to make up a board title. Since, a title named "citizen-based town planning for Nanboku-shi" is input in the example shown, the title "citizen-based town planning for Nanboku-shi" makes up a board title. Likewise, when letters are input into an input box 2005 displayed adjacent the item "a word comment", a string is input which represents a comment of the board manager 120. Provided adjacent the input box 2005 is a scroll button 2006 for confirmation of the contents of the comment. When numerals are Input into input boxes 2007, 2008 displayed adjacent the items "board size (width)" and "board size (height)", the dimensions of the length and the width of the board are determined.

When numerals are input Into an input box 2009 displayed adjacent the item "number of letters of a comment displayed in a line," a maximum number of letters is determined. When font sizes are determined by means of the selection buttons 2012, 2013 provided in input boxes 2010, 2011 displayed adjacent the items "font size of card" and "font size of comment input/display", the font size for a card on a board and the font size at the time of input of a comment, respectively, are registered.

The item "selection of function of card" includes items "with Image", "indication of genre of card", and "indication of color of card", and when a check box 2014 displayed adjacent the item "with image" is turned ON, pasting of an image on a card is made possible.

Likewise, when a check box 2015 displayed adjacent the item "with function of vote" is turned ON, a vote function by attributes (categories), such as approval, disapproval or the like, is made effective. When check boxes 2016, 2017 displayed adjacent the items "indication of genre of card" and "indication of color of card" are turned ON, an Indication of the genre of the card and an indication of the color of the card are made effective.

The genre of a card is displayed adjacent the item "indication of genre of card". In this example, items, "question", "reply", "proposal", "opinion", and "others" cause the genre of a card to be created. Provided below the items "approval", "disapproval", "question", "reply", and "others" displayed on respective cards are selection boxes 2018, 2019, 2020, 2021, and 2022 for determining the colors of these cards. Colors of cards are determined by scroll buttons 2023, 2024, 2025, 2026, and 2027 prepared adjacent the respective selection boxes 2018 to 2022.

Also, while blue, pink, green, yellow, and purple are displayed in the illustrated example, they may be replaced by other colors. While colors displayed in the selection boxes 2018, 2019, 2020, 2021, and 2022 are prepared beforehand in the illustrated example, other colors may do so long as a clear distinction can be made.

When letters and numerals, respectively, are input into input boxes 2027, 2028, 2029, 2030, 2031, and 2032 adjacent the respective items "manager ID", "managers name", "mail address of manager", "setting of members", and "password", the manager ID, the manager's name, the mail address of the manager, the setting of members, and a password are registered in the board manager 120. In addition, for example, in the case where an open is provided in the setting of members, the status 401 in the board data 400 shown in FIG. 4 indicates 1, and, in the case where a qualified member is set, the status 407 indicates 2.

When a selection button 2034 adjacent the Item "display position of background picture image" is clicked, the display position of a background picture image is registered. In the illustrated example, "upwardly leftward" is selected, and so a background picture Image is displayed upwardly leftward on a screen.

When a file name formed of letters and characters is input into an input box adjacent the item "file name of background picture image", a file of the same name as that registered in the board manager terminal 121 is selected as a background picture image and is registered as a background picture image on a board. Also, when a reference button 2036 displayed adjacent an input box 2035 is clicked in the item "file name of background picture image", a dialogue box (not shown) is opened, and a list of all file names in the board manager terminal 121 is displayed. When one file is selected among the list of file names, it is displayed as a background picture image in a board.

In addition, while documents, figures, such as maps, and various photographs are used in the picture image file and stored in the board database 214, files of picture Images suffice to be files required for a communication through boards and cards. Also, items produced in the operation of a communication are suitably added to the registration screen. In this manner, when necessary matters are input on the board registration screen 2001 shown in FIG. 20 and "register" is selected, information as input is transmitted to the community management server 101 from the board manager terminal 121, and the board display/management unit 213 allots the board ID401 (see FIG. 4) to the Information to register the same as a new board in the board database 214. In addition, information registered on the board registration screen 2001 may be capable of being corrected after registration.

While setting on the board registration screen 2001 permits registration of boards and display conditions of cards and registration of expressive power and the discriminative quality of cards, there are some cases where a board and cards, and cards themselves, overlap one another complexly so as to become hard to see when a number of cards exceeding a limited number are pasted on one board. Here, such a problem can be solved by creating a section board, in which only a card required for continuation of a communication is copied on a board having the same background, and the section board is used to replace a card being presently used.

FIG. 21 shows an example of board management screens for creation of a section board. When aboard management screen 2050 is displayed with the use of the board manager terminal 121 (FIG. 21A) and an item "board division" on the board management screen 2050 is clicked, the screen is switched over to a board list 2051 by the board display/management unit 213 (FIG. 21 at (b)).

When a check box 2052 prepared on the left side of items representative of "contents of board" is turned ON and an OK button 2053 is clicked in the board list 2051 a screen withcards pasted on a pre-division board 2054 is displayed as shown in FIG. 21 at (c). When a necessary card is clicked on this screen to be selected, the card selected by the clicking is changed in color to be visually discriminated from other cards, as shown in FIG. 21 at (d). In this state, when a decision button 2055 displayed overlappingly on an upper screen portion of a pre-copy board is clicked, a board cooperation confirmation screen 2057 is created (FIG. 21 at (e)). For a final confirmation, the board cooperation confirmation screen 2057 displays the number of cards being displayed and a message as to whether a board 2061 should be used in cooperation with the ex-division board. In the illustrated example, there are displayed confirmation messages "cards being moved to anew board (board after division) are two", and "should new and old boards (pre-division board, post-division board) be cooperated?", selection items "cooperation" and "non-cooperation" are displayed, and an Input box 2058, by which a name of a new board is input into the board 2061 for storage in the board database 214, is displayed.

Here, when a name is input into an input box 2058, a check box adjacent the item "cooperation" is turned ON, and a decision button 2060 prepared in a lower portion of the screen is clicked. A section board 2061 having the same background as that of the pre-division board and having pasted thereon only cards necessary for the progress of a communication is created to be stored in the board database 214 (FIG. 21 at (f)). At this time, since the section board 2061 is used in place of the pre-division board, the status 407 (see FIG. 4) in the board data 400 including planning of B-cho, Tozai-shi and being a pre-copy may be made non-open, or the board manager 120 may set the status 407 to non-open.

In this way, the number of cards on a board is reduced, so that the relationships between boards and information of cards and between cards are clearly grasped and, a smooth operation of a communication is made.

In addition, while FIG. 21 illustrates a configuration in which necessary cards are indicated from a present board and copied onto the section board 2061, a section board may be created by not displaying unnecessary cards on the section board 2061 after all cards on the present board have been copied onto the section board 2061.

In this case, in order to not display unnecessary cards on the section board 2061, it is conceivable to mask (paint out) unnecessary cards or to transfer them into other database. Also, while a necessary file or files are copied from the pre-division board in the creation of the section board 2061, the board may be divided to display a new board having backgrounds different from the pre-division board. In addition, when a card is not to be displayed, check boxes for designating cards as being non-displayed cards may be provided on a list Of all cards to, switch between display and non-display by switching the check boxes ON and OFF. Also, while a card that is selected is automatically changed in color for discrimination between the card selected and other cards, discrimination may be made by thickening frame lines of the card that is selected, changing a pattern and the color of frame lines, or marking the card that is selected. Also, while the section board 2061 is ordinarily created when the board manager 120 inspects a board and a multiplicity of cards are added to the board, it is desirable that the section board 2061 be automatically created in the situation, in which the board manager 120 cannot perform inspection, or in which cards are added in a short time due to activation of a communication caused by the cards.

In such a case, when the number of cards in a pre-copy board is estimated and the estimated value exceeds a predetermined value, a predetermined number of cards, among cards finally pasted on a parent card on a board, may be pasted on the section board 2061 by copying or movements to be used. In addition, the number of cards being copied or moved to the section board 2061 from a pre-copy board will be empirically determined.

Meanwhile, in examining the nature and operation of a communication, there are some cases where a plurality of boards are aligned, to present a theme, and it is desirable to represent a theme by, aligning boards related to one another. Such being done, a theme in a communication can be in some cases represented by a plurality of boards created by the board manager 120, and not only necessary data, but also organic, related Information, can be collected in some cases. Also, It can be said that the user 110 easily uses such a setting that a related board can be referenced without making a search.

FIGS. 22 to 27 show an example of registration screens, which make it possible to coordinate a plurality of boards and reference them. Board coordination information registered by these registration screens is stored in the board database 214.

Figure 22:
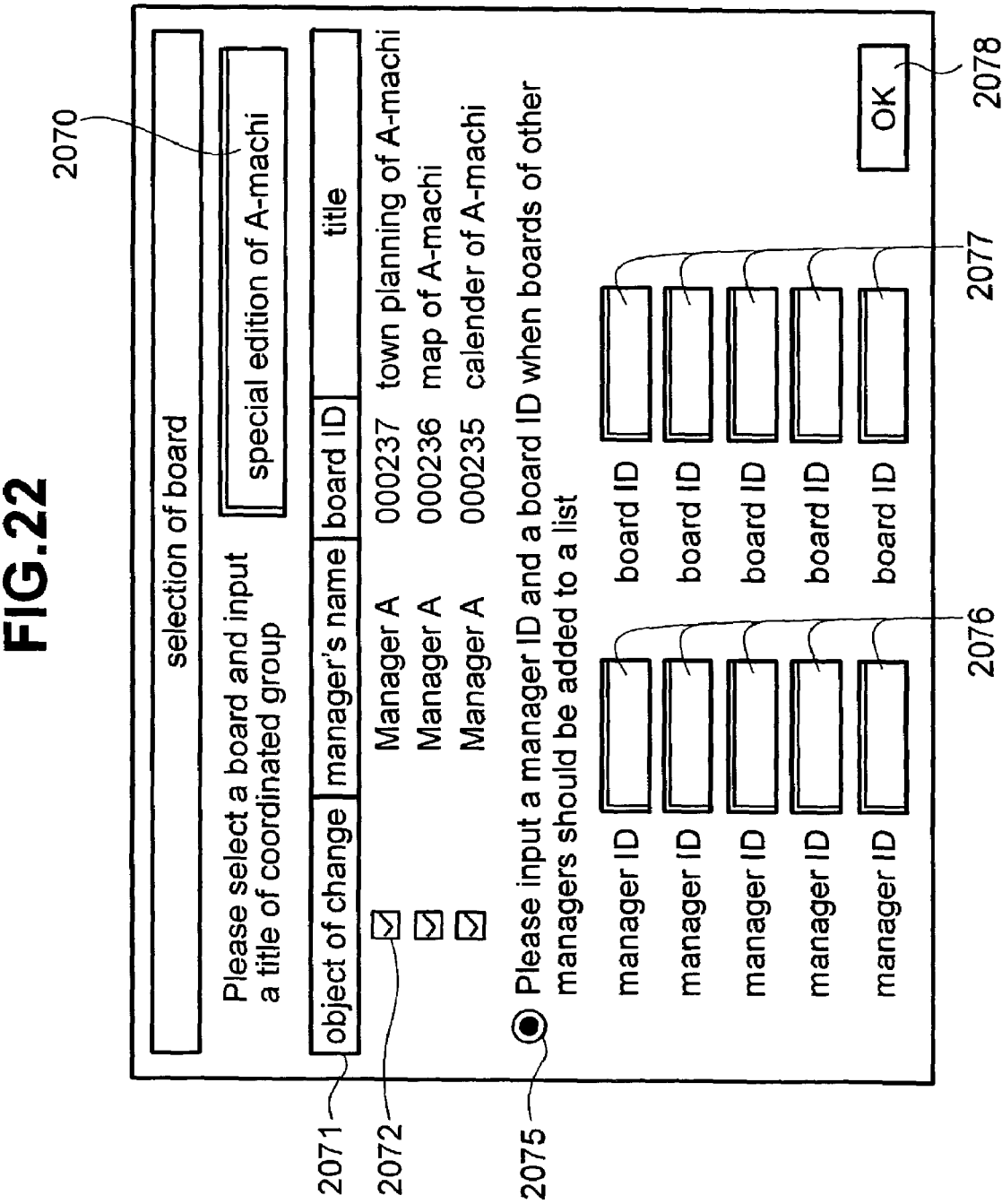
FIG. 22 is a diagram showing a lower layer screen for creation of a coordinated board.

When coordination of a board in the board management menu 2050, as seen in FIG. 21 at (a), is clicked, a registration screen shown in FIG. 22 is displayed. In FIG. 22, provided in an upper portion of the registration screen, there is an input box 2070 for registration of a plurality of boards as a coordinated group; and, provided in a task bar 2071 below the input box 2070, there are the items "object of change", "manager's name", "board ID", and "title". When a check box 2072 on the left side of managers name is turned ON and an OK button 2078 is selected, the confirmation screen shown in FIG. 23 is displayed; a manager's name, board ID, and title are determined; and a confirmation button 2079 is displayed in a lower portion of the screen. In the screen shown in FIG. 23, "special edition of A-machi" forms a group title. In this state, when the confirmation button 2079 (OK button in the illustrated example) in the lower portion of the screen is selected, the board management menu 2050 shown in FIG. 21 is displayed. As shown, in FIG. 24, when the user 110 selects and displays a board of the town planning of A-machi, or a map of A-machi, or a calendar of A-machi, a pulldown menu 2074 is displayed on an upper portion of the board. For example, in the case where a board of the town planning of A-machi is displayed, when the user 110 selects a map of A-machi in the pulldown menu 2074, selection of the map of A-machi is transmitted to the community management server 101 from the user terminal 111, and the board display/management unit 213 and the card editing/display/management unit 215 display will a board of the map of A-machi by way of the board database 214 and the card database 216.

In the screen example, a coordinated board of the coordinated group "special edition of A-machi" is constituted by "town planning of A-machi", "map of A-machi", and "calendar of A-machi" displayed on the dialogue box 2074. In addition, while FIG. 24 shows an example in which a coordinated board can be selected in the pulldown menu, a display layout in a coordinated board may be tandem, or cross-compound, or an arrangement of respective boards may be denoted by X coordinates and Y coordinates to display boards on the same screen.

As shown in FIG. 25, in the case-where boards created by a plurality of board managers 120 should be coordinated, a radio button 2075 on a left side of the manager IDs in a lower portion of the screen is turned ON, boards desired to be coordinated are selected, a manager ID is input into an input box 2076 of a manager, (board manager 120) displayed in tandem in the lower portion of the screen, and a board ID is input into an input box 2077. In this state, when a confirmation button (OK button in the illustrated example) 2078 displayed downwardly rightward on the screen is clicked, the confirmation screen shown in FIG. 26 is displayed to list boards of the plurality of board managers 120 set on the previous, screen as a coordinated board. In the case where this list is in order, a confirmation button (OK button in the illustrated example) 2079 displayed downwardly rightward on the screen is clicked, and then information of this coordinated board is registered. When the user 110 selects and displays any one of the boards displayed in the title shown in FIG. 26, a pulldown menu 2080 shown in FIG. 27 is displayed in an upper portion of the board. When a scroll button 2081 is clicked in this pulldown menu, names of all boards displayed in the title shown in FIG. 26 are displayed. A way to use the boards is the same as that illustrated in FIG. 24.

When a coordinated group is created in this manner, respective boards in the coordinated group are placed under management of the board display/management unit 213 and are displayed on screens of the respective terminals 121, 1111 by the board display/management unit 213.

In addition, the coordinated group may be changed or deleted. In the case where a change is desired, a coordinated group that is to be changed is selected, and deletion or addition of boards thus listed is carried out. Also, one board may belong to a plurality of coordinated groups. In the case where a screen of a board belonging to a plurality of coordinated groups is desired to be displayed, the pulldown menus 2074, 2080 displayed in an upper portion of a board may be displayed in plural.

Figure 28:
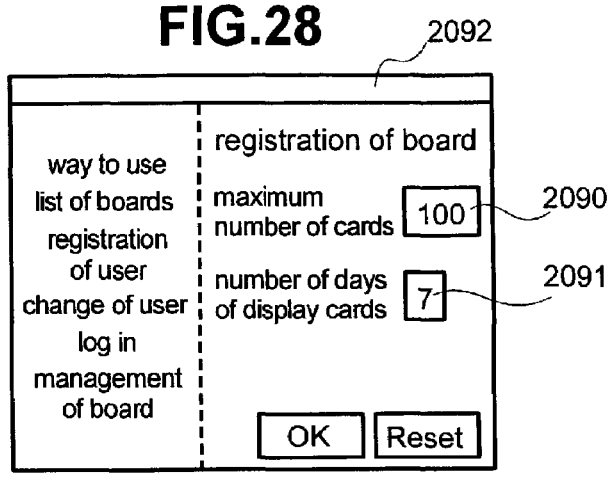
FIG. 28 is a diagram showing a registration screen for setting of number of cards on a coordinated board.

FIG. 28 shows a registration screen for setting of a number of cards on a board. More specifically, in a communication system with boards and cards, since a display area in a board is limited and a display area in a single card is also limited, it becomes difficult to recognize the contents of cards in lower layers, the link lines between cards, and the information in boards when the number of cards pasted on a board exceeds a limited number.

Here, a maximum number of cards per board are limited as shown in FIG. 28. In FIG. 28, an input box 2090 is provided laterally of an Item "maximum number of cards", and a maximum number (100 in the illustrated example) of cards is registered in the input box 2090. In addition, a reset button for cancellation of registration is also provided. Also, on the registration screen 2092, an input box 2091 is provided adjacent the designation "number of days of displaying cards" to enable registering the number of days of displaying cards. Information input on the registration screen 2092 is registered in the board database 214, and the card editing/display/management unit 215 references information in the board database 214 to automatically causing cards in excess of a maximum number of cards and cards in excess of a number of days of displaying cards by way of the card database 216, to be non-displayed on aboard, thereby preventing a drop of the visibility of cards and boards caused by an increase in cards pasted on a board. Of course, cards being placed in a non-displayed state can be displayed if needed.

In addition, in the case where an attribute (approval, disapproval) is given to respective cards to make cards distinguishable by way of such an attribute, a check box or the like maybe used to switch over between display and non-display by attribute.

Figure 29:
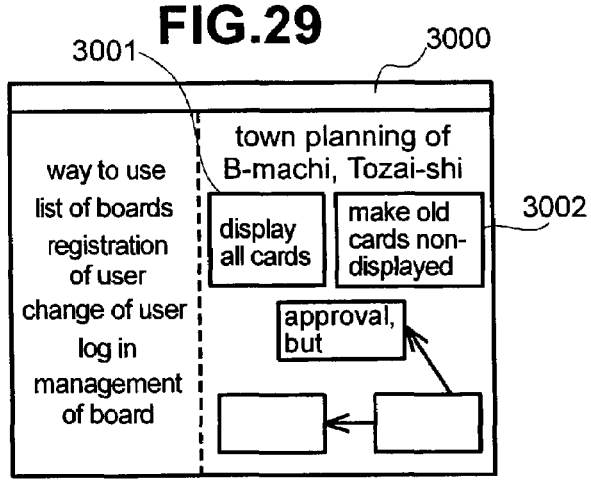
FIG. 29 is a diagram showing a registration screen for making a board easy to see by manually placing a card or cards, which have been present for a predetermined period of time, in a non-displayed state.

FIG. 29 shows a screen image 3000 of a board for which a maximum number of cards and a number of days of displaying cards are set in FIG. 28. When the user 110 selects a "display all cards" button, a card which has been non-displayed according to the setting in FIG. 28 can be displayed, and when "make old cards non-displayed" 3002 is selected, a card can be in a non-displayed state according to the setting in FIG. 28. In addition, the number of cards being displayed may be set so as not to exceed the maximum number of cards even in the case where the "display all cards" button 3001 is selected. Also, it may be possible to use a function of displaying only a card or cards linked with a board background, a function of displaying only a card or cards of a specific genre or color, a function of displaying only a card or cards in a specific link group, or the like.

Figure 30:
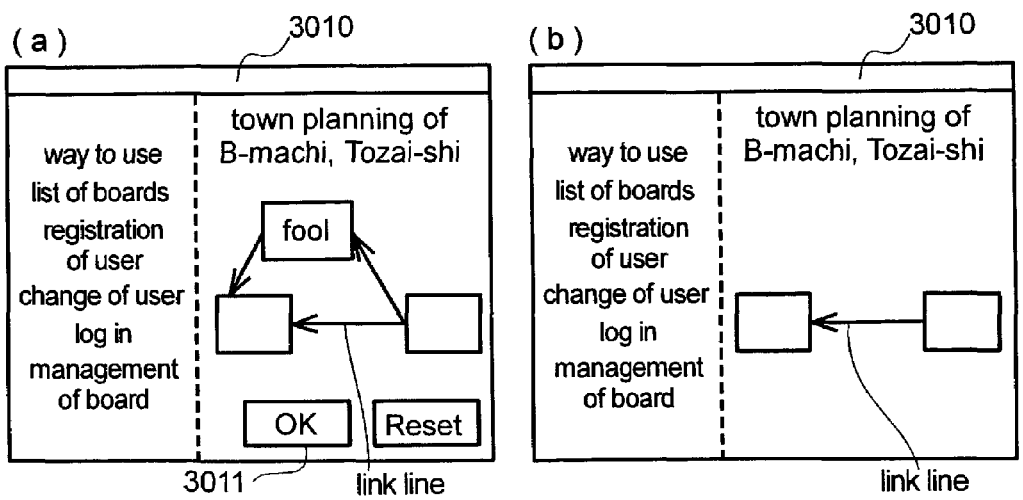
FIG. 30 is a diagram showing a setting screen for taking measures for flaming.

FIG. 30 is a view showing screen images which exist at the time of taking measures for flaming. When a card or cards containing abusive or defamatory material remain pasted, a communication or the quality of the communication is degraded. Here, the board manager 120 sets a function which makes it possible to delete a card or cards displaying that are abusive and defamatory, as measures for flaming.

The board manager 120 logs in at a setting screen 3010 with a manager ID. In the setting screen, a board and cards constituting a field of a communication are displayed as they are. Here, when a card, which includes abusive or defamatory material and is to be deleted, is indicated by clicking and a confirmation button (OK button in the illustrated example) displayed in the lower portion of the screen is clicked, the indicated card and link lines are placed in a non-displayed state, as shown in FIG. 30B.

In addition, in the case where a card including abusive or defamatory material is incorporated in a plurality of cards connected to one another by link lines, link lines are pasted on related cards after the card and the link lines are placed in a non-displayed state. Link lines may be automatically pasted on the front and back cards on the basis of a file, in which information of the connection of cards is recorded.

Also, a card or cards need not be non-displayed, but may be masked or changed to a small Icon so as to make the comment contents thereof not understandable, or a comment or comments (deleted because of problematic contents) of the board manager 120 may be displayed so as to overlap a card or cards, which are desired to be non-displayed. Also, the board manager 120 may provide a setting so as to enable deletion of all cards and use the comment deletion menu items 803 of FIG. 8 to enable deletion of a card or cards including abusive or defamatory material. Further, a menu for deletion of cards may be provided on the board management menu, which is displayed when the board manager 120 logs in, so that when the board manager 120 clicks on card deletion and indicates a board including a card or cards to be deleted, the board is displayed, and, at the same time, a user 110 cannot read the board.

FIG. 31 shows an example of registration screens for a user 110. A registration screen 3049 for a user 110 is displayed when the user 110 commences use and registration.

The registration screen 3049 for a user 110 includes items for inputting of a notice assignment, such as "name", "nickname", "contact address ("residence", "telephone number" (TEL), "FAX", "e-mail address")", "password (temporary password)", "a word comment", or the like, of the user 110, and registration matters for specification of the user 110 and items for registration of a mail notice assignment. Input boxes 3050 to 3058 for inputting of corresponding data are provided laterally of the respective items.

Also, while not shown, the registration screen 3049 provides a registration screen for desired items for registration of the date and hour of mail notice assignment service and the contents of a mail notice assignment service. While desired items can be displayed on the registration screen 3049 as illustrated in FIG. 38, to be described later, they maybe provided on a group screen called from the registration screen. In either case, check boxes are turned ON and desired items are registered.

Set in the desired Items in a mail notice assignment are an item for registration of the date and hour of the mail notice assignment, an item for notice assignment of a desired board and a desired card or cards, and an item for notice assignment of changes in the contents of a desired board, or a desired card or cards, or members.

Set as the item for the notice assignment of changes in the contents of a board are items for all card notice assignment of cards added after a point of time when a mail notice assignment is registered, a specified notice assignment of only added cards related to a specific card, and a notice assignment of member information of the update of communication members in a specific communication.

When the user 110 turns a check box 3059 on a left side of a desired board name ON after registration of registration matters in the-input boxes 3050 to 3058 for mail notice assignment and clicks a "confirmation" button 3060 provided in a lower portion of the registration screen 3049 in that state, a user registration content confirmation screen (not shown) is displayed, and when a confirmation button (not shown) on the user registration content confirmation screen is clicked, registration matters are transmitted to the community management server 101.

Registration data formal notice assignment, that is transmitted from the user 110, is stored as data of desired mail notice assignment of the user in a mail dedicated database (not shown), such as the board database 214, a mail server, or the like, so as to be put under the control of the board display/management unit 213.

The board display/management unit 213 references the data of a desired mail notice assignment so as to provide a notice assignment of mail. In the illustrated example, boards named "map in a region facing Aozora station", "town planning of Tozai-shi", and "support for parenting" are selected, and, in this case, notice assignment of the contents of the boards named "map in a region facing Aozora station", "town planning of Tozai-shi", and "support for parenting" is provided. In this case, notice assignment of all cards regarding "map in a region facing Aozora station", "town planning of Tozai-shi", and "support for parenting" as items of notice assignment desired by the user 110 is provided at the date and hour desired by the user 110 when the above all card notice assignment is registered, and notice assignment of only added cards regarding "map in a region facing Aozora station", "town planning of Tozai-shi", and "support for parenting" is provided when the user 110 desires specified notice assignment in this case, when the user 110 desires notice assignment of specific cards, for example, additional cards regarding a question of the genre of "town planning of Tozai-shi", notice assignment of only the additional cards is provided. When the user indicates specific boards and desires notice assignment of comments of new subscribers names and introduction of members, notice assignment of only new subscribers" names and comments is provided. Since the amount of data for specified notice assignment is small as compared with all card notice assignment, the communication load can be reduced. In addition, notice assignment data for all card notice assignment and specified notice assignment may be displayed on a personal unit board of a user 110 as a private field, and the user 110 may be able to reference the personal unit board. Also, data for mail notice assignment may be stored as personal unit data of the user 110 in a mail server (not shown) in the form of a private mail box and notice assignment of mail may be provided upon instruction from the user 110. In this way, the communication load can be reduced more than the mail notice assignment at all times.

In the above-specified notice assignment, in the case where it is desirable to additionally transmit new subscribers for a specific board and items therefor are selected, a registration screen for the above-mentioned mail notice assignment may display input boxes for inputting of a member ID and a password for authentication of membership for the board to permit registration of a member ID and a password, and to cause the board display/management unit 213 to make compare the member ID and password, thereby preventing unauthorized access to data from the specific board. Further, portable terminals may be able to make access to a communication of a board and cards. In this case, a screen of a port able terminal displays a list screen of board titles and card lists of respective boards as a lower layer screen of the list screen, and the contents of a card or cards are displayed in text upon selection of a card or cards. In addition, a portable terminal may cause a search engine in the communication system to indicate the context of boards and cards to retrieve strings in boards and cards, and notice assignment of a comment or comments in the retrieved card or cards may be made to the portable terminal. Also, in the case of adding a card or cards to a specific card retrieved in a portable terminal, data describing a comment or comments with respect to data of boards and cards, of which notice assignment has been made from the communication system, are replied, but it is difficult to display all the boards on a screen of the portable terminal. Therefore, in such case, additional card or cards from a portable terminal: are pasted in a position indicated by the board display/management unit 213. In addition, a paste area is determined beforehand so as to not interfere with pasting of other cards by means of the user terminal 111.

Figure 32:
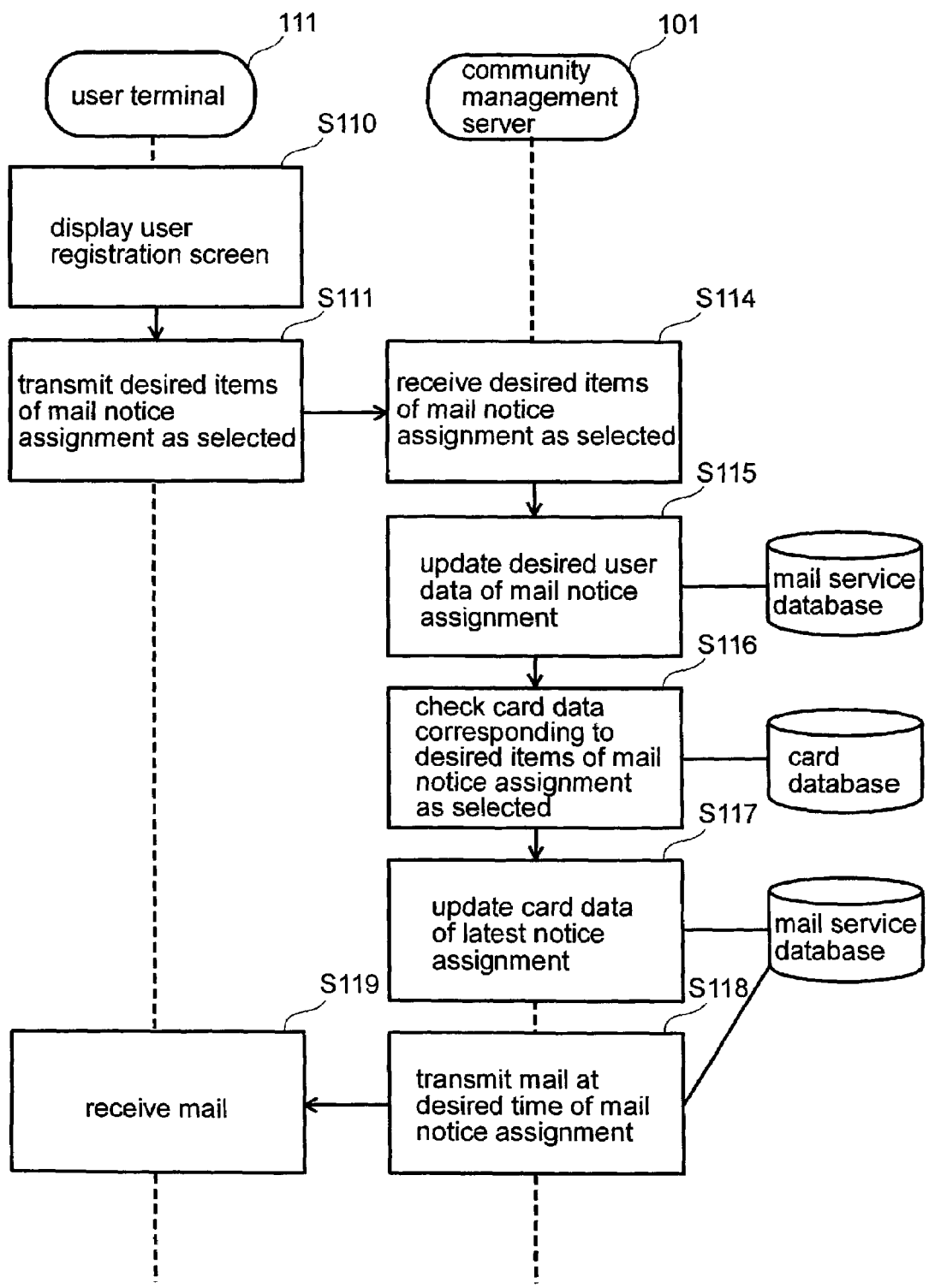
FIG. 32 is a flowchart showing an example of the process flow in a mail notice assignment in the embodiment.

FIG. 32 is a view showing an example of a flowchart in a mail notice assignment in accordance with the embodiment. When a user 110 clicks a user registration menu for registration of a user, the registration screen 3049 is transmitted to the user terminal 111 from the community management server 101 so as to be displayed on a screen of the user terminal 111 (STEP S110). The user 110 inputs matters for specification of the user 110, such as the name, nickname, residence, mail address, password, contact address, a word comment, or the like, of the user 110, in to input boxes 3050 to 3058 on the registration screen 3049, turns a check box 3059 adjacent a desired board name ON, and further selects either of the items, that is, all card notice assignment-and specified notice assignment, with the use of a check box. When a transmission button (not shown) is clicked in this state, registration data registered on the registration screen 3049 are transmitted to the database of the mall service via the community management server 101 (STEP S111).

When the community management server 101 receives a demand for the service of a mail notice assignment from the user terminal 111 (STEP S114), it references the data of the desired mail notice assignment to update the contents of the notice assignment service (STEP S115). Subsequently, the data of desired mail notice assignment transmitted from the user terminal 111 is used to retrieve boards and cards, so that data of a corresponding board and cards are stored in the mail server to update the data (STEP S111).

The mail server transmits data of boards and cards to an appointed mail address of the user 110 at the date and hour, transmitted from the community management server 101 (STEP 5118), and the user terminal 111 receives data of the desired contents from the mail server at the date and hour desired by the user 110 (STEP S119).

FIG. 33 is a view showing a structural example of calendar data of a community calendar selected by the board type 411 in the board data 400 shown in FIG. 4. Calendar data 1200 is data in a tag type required for board management and board display, and it is registered when the board manager 120 Installs a board. Information interposed between calendar ID tags represents a calendar ID1201 and specifies a board on which an icon is pasted. Information interposed between type tags represents a title 1202 of a calendar as a board, and information Interposed between status tags represents open approval and disapproval information 1203, such that "1" indicates an option of open and "2" indicates an option of opening a board to a specific user 110. Information interposed between calendar registration date tags represents a date 1204 at which the board manager 120 registers a community calendar, the date being represented in the Christian era. Information interposed between calendar title, tags represents a title 1205 of a calendar. Information interposed between manager ID tags represents a manage ID 1206 to be used for authentication at the time of update and deletion of board data. Information interposed between manager name tags represents a managers name 1207. Information interposed between manager mail-address tags represents a manager's mail address 1208, and information interposed between calendar comment tags represents a board comment 1209, such as a board introduction statement written by the board manager 120. Information interposed between password tags represents a password 1210 required for referencing the calendar, and it is used for limitation of a specific user 110 through communication of the password 1210 to the user 110. Information interposed between type tags represents a card type 1211 being a card display type, and information interposed between calendar update tags represents a date 1212, at which registration information of a community calendar is changed by the board manager 120, the date being represented in the Christian era.

Information Interposed between color setting tags represents setting information 1213 for setting the color of the icon.

FIG. 34 is a view showing a structural example of event data 1400 of the community calendar. Event data 1400 describes data required for editing, display and management of cards, in a tag type. Information interposed between event. ID tags represents an event ID1401 to specify an event. Information interposed between registration date tags represents information 1402 for specifying a registration date of event data, and information interposed between calendar ID tags represents information 1403 for specifying a community calendar. Information interposed between event holding date tags represents registration date information 1404 for registration of a holding date of an event, and information interposed between event title tags represents an event title 1405. Information interposed between event place tags, information Interposed between event beginning time tags, information interposed between event ending time tags, respectively, represent an event place 1406, a beginning time 1407, at which an event performed in the event place begins, and an ending time 1408, of an event; Information interposed between icon genres and information Interposed between icon, respectively, represent an icon genre 1409 and an icon type 1410 illustrated in FIG. 39 described later.

Information interposed between event content tags represents event contents 1411 illustrated in FIG. 40, to be described later, to display a comment on a whole-text display screen. Information interposed between event reception tags represents a reception 1412 for holding an event, information interposed between, URL tags of related Information represents a URL 1413 related to an event, Information interposed between picture image file tags represents a picture image file 1414 displayed on an event window, and information interposed between update date tags represents an update date 1415 of an event. Also, information interposed between update time tags represents an update time 1416 of event information, information Interposed between user ID tags represents a user ID 1417, information interposed between user name tags represents a user name 1418, information interposed between telephone number tags represents a telephone number 1419, information interposed between FAX tags represents a FAX 1420, and information interposed between mail address tags represents a mail address 1421, these specifying a sponsor of an event. Information interposed between application deadline date tags represents an application deadline date 1422 for an event, information interposed between application deadline time tags represents an application deadline time 1423 on an application deadline date, and information interposed between desired mail notice assignment tags represents information 1424 as to whether a mail notice assignment should be provided, "true" meaning that a mail notice assignment is desirable.

FIG. 35 is a view showing a structural example of user data for a community calendar. User data 1500 is data required for user management and display of speakers information, in a tag type information interposed between user ID tags represents a user ID1501, and information interposed between update date tags represents an update date 1502 of event data. Information interposed between password tags represents a users password 1503. User 1D501 and password 1503 are input data required at the time of login. Information interposed between users name tags, information interposed between nickname tags, information interposed between residence tags, information Interposed between telephone number tags, information interposed between FAX number tags, and information interposed between mail address tags, respectively, represent a users name 1504, nickname 1505, residence 1506, telephone number 1507, FAX number 1508, and-a mail address 1509, which constitute information for specifying a user. Information interposed between word comment tags represents comment contents 1510, and information Interposed between registration date tags represents a registration date 1511, at which registration of a user is effected.

Authority tags represent an authority 1512 for log in, a user 110 being capable of log in with a user authority and a manager 120 being capable of log in with a manager authority. Information 1513 to 1508 interposed between opening tags of a word comment, opening tags of a name, opening tags of a nickname opening tags of a telephone number, opening tags of a FAX number, and opening tags of a mail address, respectively, represent information for determination of whether opening to the public is made with consent of the person himself, true indicating an option of opening to the public, and false indicating an option of non-opening to the public.

Also, information interposed between URL tags represents a URL 1519 on the Internet, and information interposed between mail notice assignment setting tags represents information 1520 as to whether a mail notice assignment is desired true indicating an option of desire, and false Indicating an option of non-desire.

FIG. 36 is a view showing a structural example of mail service data for the community calendar in accordance with the embodiment. Mail service data 1521 is user information to be stored in the user database 212 and controlled by the user management unit 211. Information interposed between user ID tags and information interposed between mail address tags, respectively, represent a user ID1522 and a mail address 1523 of a user. Information interposed between mail desire board ID tags represents the ID (mail desire board 1D1524, mail desire board ID1526) of a board, for which mail notice assignment is desired.

Information interposed between mail notice assignment settled tags represents an event ID (mail notice assignment settled event ID1525, mail notice assignment settled event 1D1527) of a latest event among events, for which mail notice assignment is settled. Information interposed between genre type tags represents a genre type 1528, and information interposed between notice assignment time tags and between notice assignment unit tags, respectively, represent a notice assignment time 1531 and a notice assignment unit 1532 of a mail, that is, a time interval of notice assignment.

Figure 37:
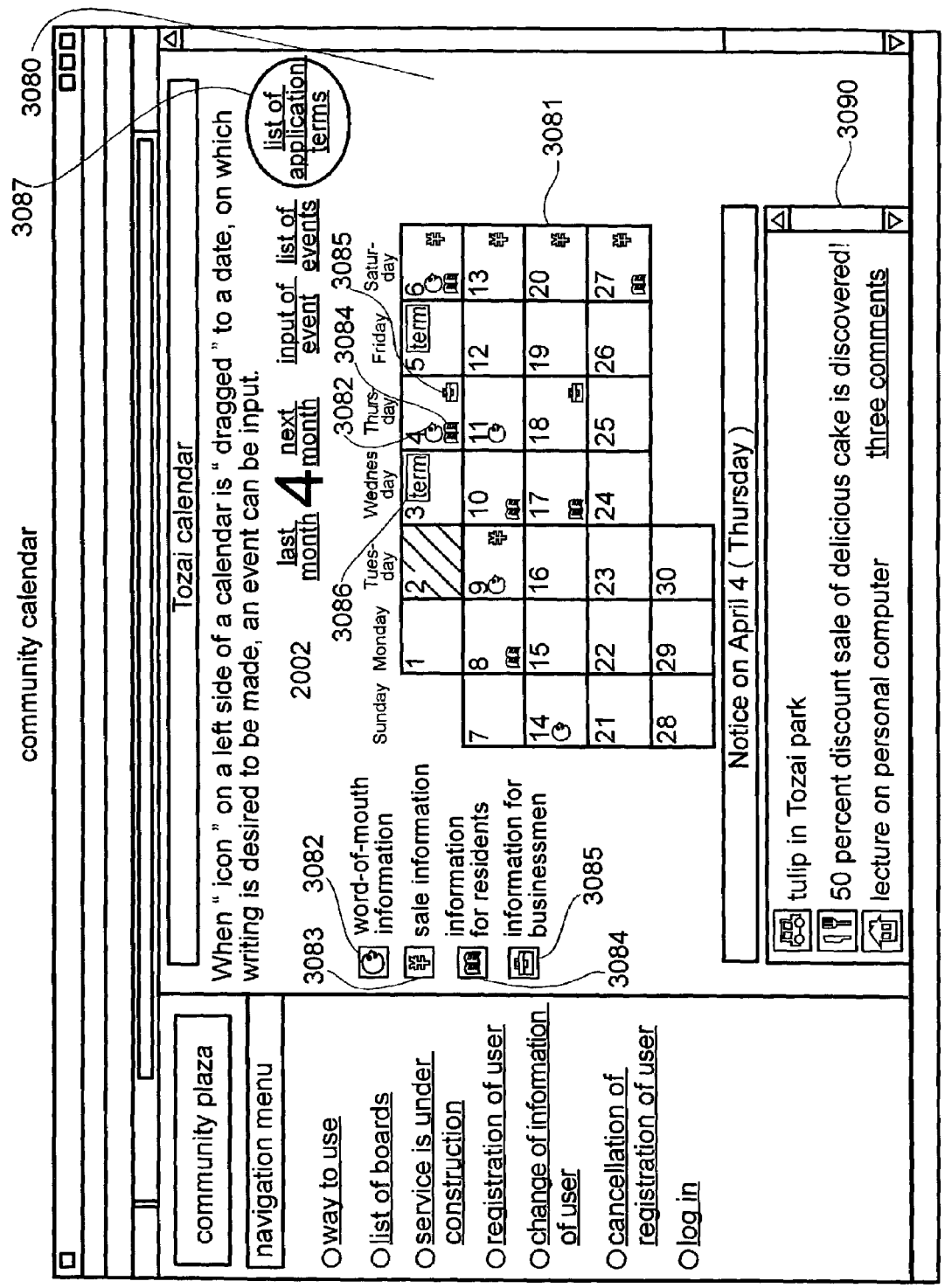
FIG. 37 is a diagram showing a screen image of the community calendar according to the embodiment.
Figure 39:
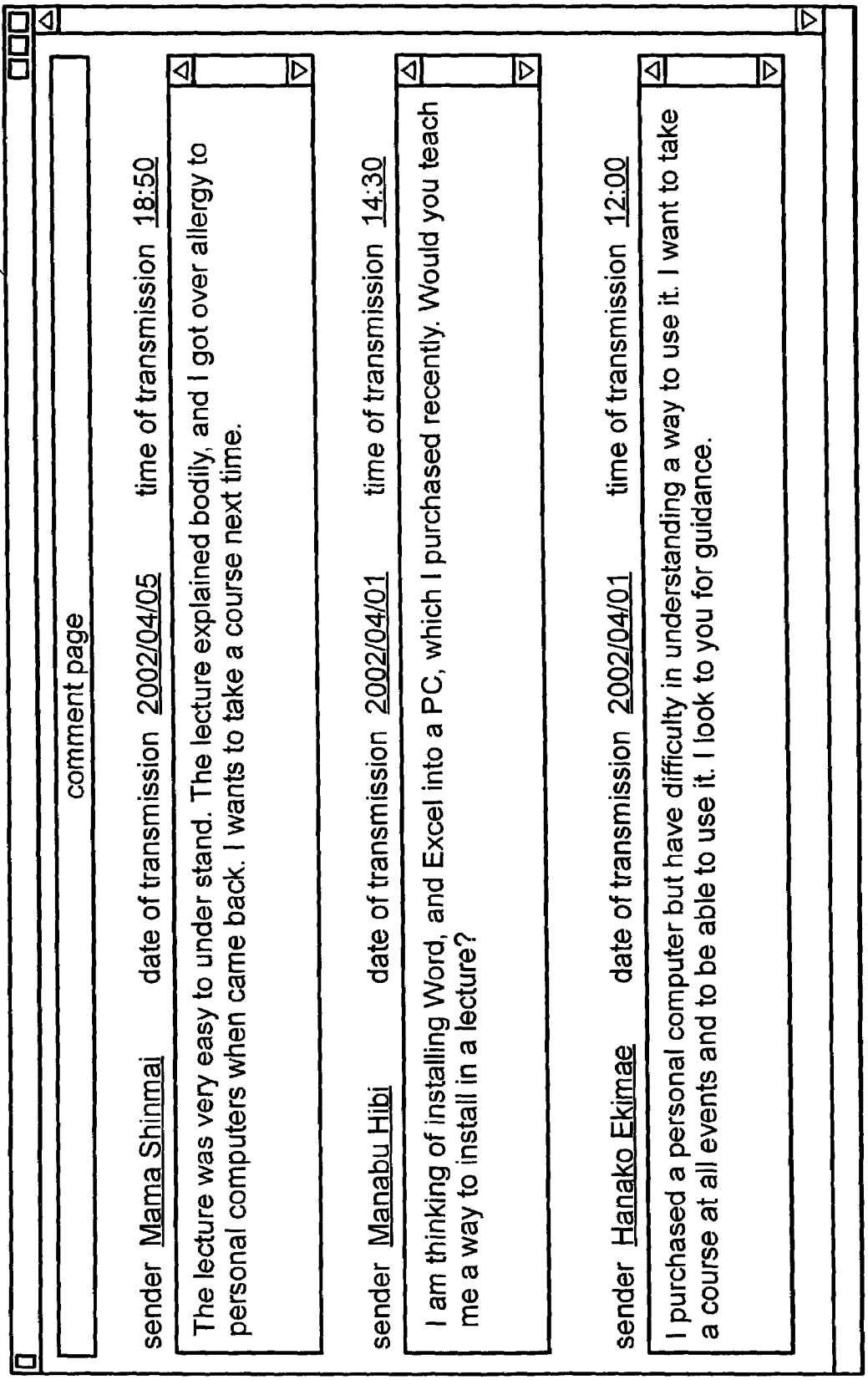
FIG. 39 is a diagram showing a comment page according to the embodiment.

FIG. 37 shows a screen image of a community calendar; FIG. 38 shows a window displaying a list of event application terms in the community calendar; FIG. 39 is a view showing a comment page; FIG. 40 shows an event display screen in the community calendar; and, FIG. 41 shows an input screen for the inputting of an event.

In a calendar forming a background of a board 3080 in FIG. 37, a calendar of the month, corresponding to date setting in the community management server 101 and beginning with Sunday is drawn and displayed by an applet, and a month of a day referenced by the board display/management unit 213 is displayed centrally on an upper portion of a screen; icons for displaying daily, events are pasted on day cells in the calendar on the board 3080. Icons constitute configurations of cards, which a user or a board manager 120, having logged into the community calendar with the use of the user terminal 111 and the board manager terminal 121, paste on the board 3080. The icons are prepared beforehand on the board 3080 in order to facilitate understanding of an object and use and to make an information genre understandable at a glance. In this embodiment word-of-mouth information 3082 composed of a deformed human face, sale information 3083 composed of a deformed ¥ mark, information 3084 for residents, composed of a deformed account book, an icon 3085 for businessmen, composed of a deformed back, and a term icon 3086 indicative of an event application term, are prepared. When an icon selected from the icons 3082 to 3085 is dragged and dropped on a day cell in the calendar 3081, the community management server 101 opens an event input screen related thereto.

Figure 40:
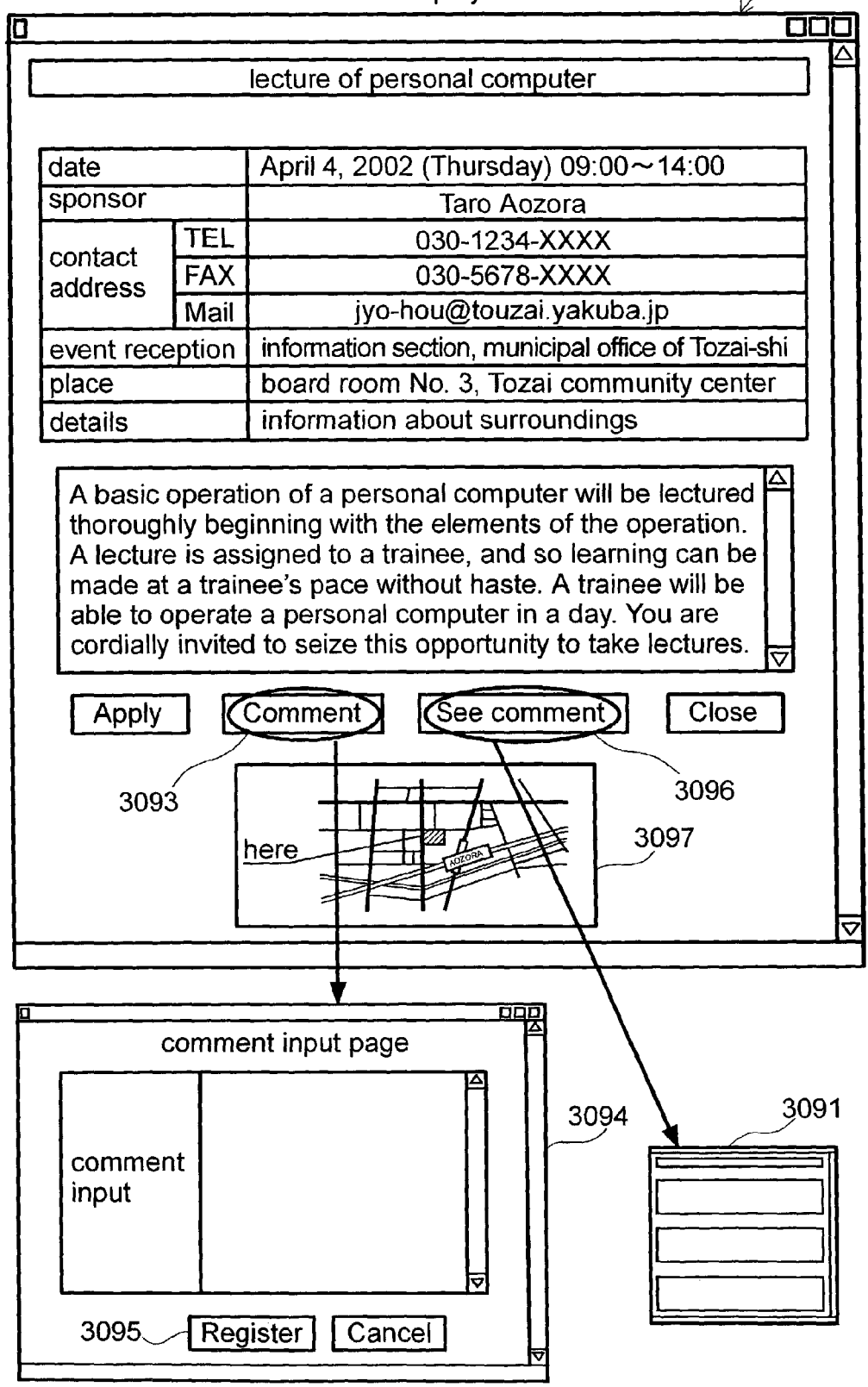
FIG. 40 is a diagram showing an event display screen in the community calendar according to the embodiment.

FIG. 40 shows an event display screen 3092 that is representative of an event display screen, and FIG. 41 shows an example of event input screens. When information is written onto an event input screen 3098 and an OK button 4008 is clicked, the written information is stored as information of the card in the card database 216 through the community management server 101. As illustrated in the user data 1500 shown in FIG. 35, when opening of user data to the public is accepted by the person himself, the contents of the user data form common information, and when not accepted, the user data forms private information.

In FIG. 37, when a user (the user 110 or the board manager 120) having logged into the community calendar clicks an application term list 3087 of events displayed upwardly rightward on the board 3080, an event window related thereto is opened. FIG. 38 shows the event window. In the illustrated example, a list is requested beforehand on the event window 3088, such that a list 3089, in which application terms are set, is displayed to represent a deadline date, holding date, event title, sponsor, and a contact address (telephone number (TEL), FAX, e-mail address). In FIG. 38, when an event title is clicked, details of the event are displayed on a separate window related thereto. FIG. 40 shows details of the event.

In FIG. 38, mail addresses (Mail) are interlocked with mailers in the board manager terminal 121 and the user terminal 111, so that when a mail address is clicked, a mailer is started.

In an example shown in FIG. 37, when returning to the community calendar, the term icon 3086 for events in cells of days of the week in the calendar 3081 is clicked, events having an application term on the day are related to one another so as to be displayed in a list of application terms shown in FIG. 38. In this example, when the event term icon 3086 pasted on April 3 in the calendar 3081 is clicked, only events having an application term on April 3 are listed. Also, when a display portion of the number of comments (portion in which three of comments are displayed the illustrated example) displayed laterally rightward in an event card 3090 displayed in a lower portion of the calendar 3081 is clicked, a comment page 3091 is displayed, as shown in FIG. 39. The comment page 3091 exemplarily displays speakers, the days of the statements, the time, and the contents thereof.

As shown in FIG. 40, an event display screen 3092 for displaying events is configured in this example such that the contents of an event can be modified corresponding to a genre of the event, for example, a column of a sponsor can be changed into a column of a speaker in the case where a genre of the event is word-of-mouth information. Also, the event display screen 3092 displays a holding date, a whole text of the contents of an event, and a picture image, as attached. In the case of a genre other than word-of-mouth information, a contact address, event reception, place, and details are displayed.

A registration button (button, on which "comment" is displayed in the illustrated example) 3093, that is displayed in a lower portion of the event display screen 3092, is related to a comment input page 3094, and the comment input page 3094 is related to the event window 3093. When the registration button 3093 is clicked on the event display screen 3092, a comment input page 3094 appears. When, a comment is input into the comment input page 3094 and a registration button 3095 is pushed, registration of the comment is terminated. In FIG. 40, when a comment display button (button on which "see a comment" is displayed in the illustrated example) 3096 is pushed, the community management server 101 calls a comment page 3091 from the card database 216 to cause comments to be displayed in sequence of the date thereof.

Accordingly, boards and icons (cards), according to the embodiment, constitute fields of communication or privacy commonly owned by the board manager 120 and the user 110, and information recorded in relation to respective icons constitutes private or common information.

Matters that are input onto the event Input screen 3098 include, as shown in FIG. 41, the date on which an event begins, the opening time, ending time, title, genre, life scene, the contents of an event, event reception, holding place, map, application term, and approval or denial of mail notice assignment in FIG. 37 in the case where icons 3082, 3083, 3084, 3085 by genre are dragged onto an intended day cell on the calendar 3081 to appoint a day, the day is displayed as an appointed date on the event input screen 3098, and a genre of an icon as selected is displayed in a genre cell. In addition, date and genre may be changed on the event input screen 3098. A life scene 4000 is selected from ones prepared in a scroll box, and the title, contents, reception, and place, respectively are input into input boxes 4001, 4002, 4003, 4004 for accumulation of information. In this case, a time 4005 maybe set every predetermined time, for example, every fifteen minutes, for the convenience of input. In addition, in the case of pasting of map information 3097 (see FIG. 40), a URL for pasting of the link can be indicated as an Item in map 4007. Application term 4006 of an event is set by inputting that date. This setting causes a term icon 3086 to be displayed in a day of input. For mall notice assignment to the, user 110, it is possible to input an indication of whether a notice assignment of the event should be made to the user 110, who desires mail notice assignment at the time of generation of an event. In addition, input of an event on the screen shown in FIG. 37 may be clicked to display the event input screen 3098. In this case, a cell of the date and a cell of the genre are displayed in a state in which an input has not yet been made.

FIG. 42 is a view showing another example of the registration screens 4010 on which a user 110 for the board and community board is registered. In addition, in FIG. 42, the same constituents as those shown in FIG. 31 are denoted by the same reference numerals, and an explanation therefor will be omitted The input boxes set on the registration screen 4010 include "name" 3050, "nickname" 3051, "residence" 3052, "password" (including a temporary password) 3053, contact address ("telephone number" 3054, "FAX" 3055, "e-mail address" 3056), "a word comment" 3057; "URL" (Universal Resource Locator) 3058, and the like. When a change is caused by update after setting, for example, a card or cards are added to a board (for example, a map in a region facing Aozora station) that has been checked on the registration screen, a notice assignment of the contents of the card or cards is made according to the desire for mail notice assignment, as illustrated and described with reference to FIGS. 31 and 32. This is the same with the community calendar.

In this example, for details of setting of mail notice assignment, a check box for setting of details of mail notice assignment is turned ON, in the case where mail notice assignment is desired, to enable selection of the time zone of the notice assignment from before noon, afternoon, and night, and: then notice assignment of mail is made in that time zone. When a notice assignment unit is indicated, notice assignment can be made in a batch for that day, or three, days, or a week. Also, genres for word-of-mouth information, sale information, information for residents, and information for businessmen for the sake of desiring only an event in a specific genre and life scene as selected are classified into five genres, that is, play, eat, buy, work, and live, so that a notice assignment of a comment in the contents as classified is provided.

Figure 43:
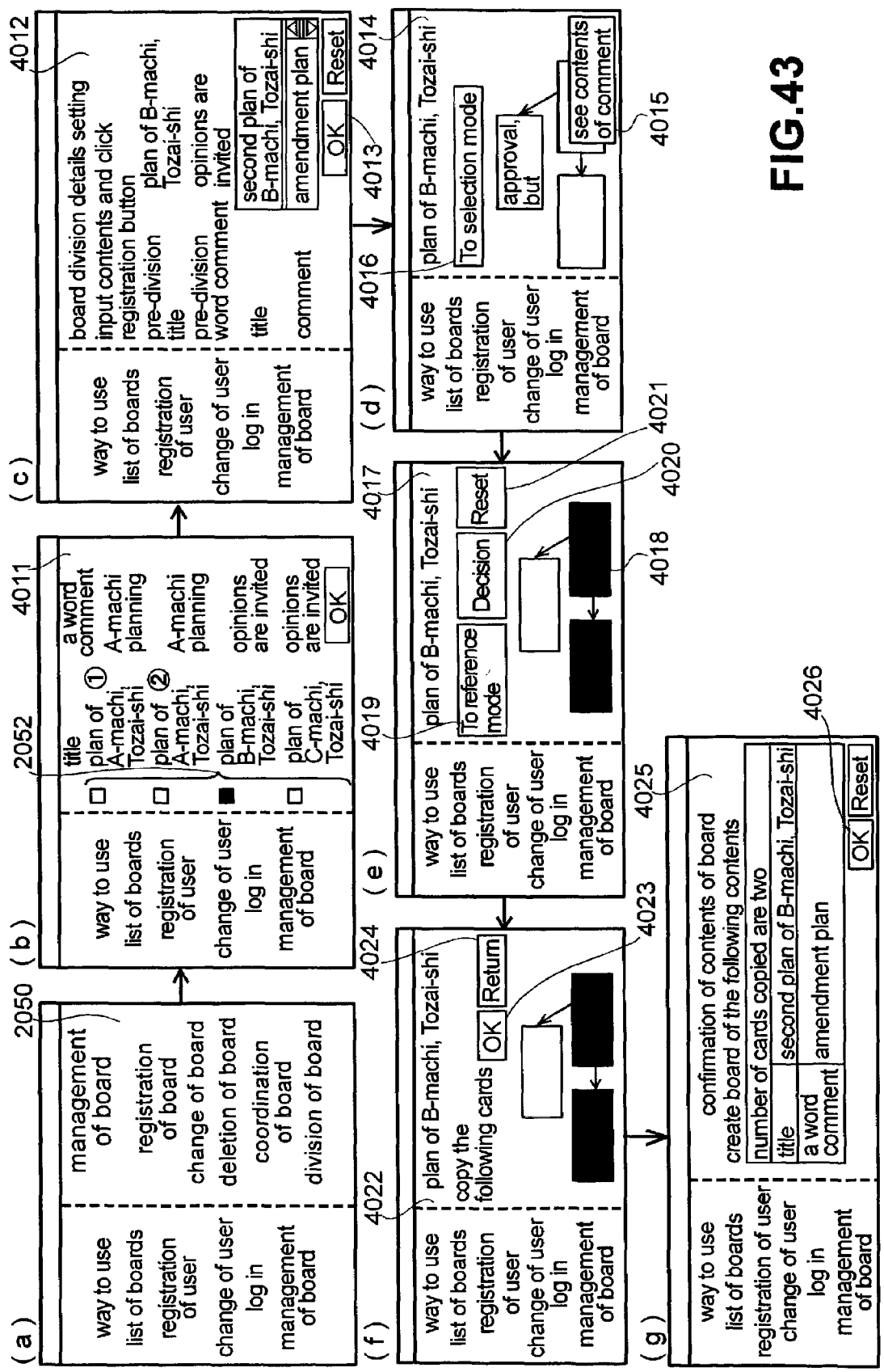
FIG. 43 is a diagram showing another example of board management screens for creation of a section board as shown in FIG. 21 in conjunction with the embodiment.

FIG. 43 is a view showing another example of board management screens for creation of the section board shown in FIG. 21. In addition, in FIG. 43, the same constituents as those shown in FIG. 21 are denoted by the same reference numerals, and an explanation therefor will be omitted.

When one of check boxes 2052 on a left side of items representative of the contents of boards, such as a board title, a word comment, or the like, is turned ON on a board list 4011 and an OK button 2053 is clicked, a board division details setting screen 4012 for registration of the title of a section board, a word comment, or the like is displayed. FIGS. 43 at (b) and 43 at (c) show the case where a town planning of B-machi, Tozai-shi is selected as a pre-division board and a second town planning of B-machi, Tozai-shi is set as a post-division board, respectively. When a title and a word comment are input on the board division details, setting screen 4012 and an OK button 4013 is clicked, a reference mode screen 4014 is displayed, in which the contents of cards in the pre-division board can be referenced in order to select a card or cards displayed on the post-division board. FIG. 43 at (d) shows the case where a board and cards in the town planning of B-machi, Tozai-shi are displayed. When a card is clicked on the reference mode screen 4014, a pulldown menu item 4015, that is capable of referencing the contents of a card, is displayed, and when the pulldown menu item 4015 is clicked, a comment whole-text display screen, as shown in FIG. 9, is displayed. When a "to selection mode" button 4016 is clicked, a selection mode screen 4017 affording selection of a card or cards displayed on the post-division board is displayed. When a card or cards are clicked on the selection mode screen 4017, the selected cards can be specified owing to a change in color, as in a card 4018. Also, color is returned to an original color when the selected cards are again clicked, and thus the cards are returned to a state of non-selection. When it is desired to confirm the contents of a card or cards again, a "to reference mode" button 4019 is clicked, and then a reference mode screen 4014 is displayed. At this time, the card or cards selected on the selection mode screen 4017 are displayed in a state of changed color also on the reference mode screen 4014. Also, when a reset button 4021 is clicked, all the selected cards are put in a state of non-selection. When a decision button 4020 is, clicked after a card or cards, which are to be displayed on the post-division board, are selected, a confirmation screen 4022, on which only selected cards are displayed; is displayed. When a "return" button 4024 is clicked on the confirmation screen 4022, the screen is returned to the selection mode screen 4017, and, when an OK button 4023 is clicked, a board division contents confirmation screen 4025 for confirmation of contents of board division is displayed. When an OK button 4026 is clicked on the board division contents confirmation screen 4025, information of the section board created is transmitted to the community management server 101 to be stored in the board database 214 by the board display/management unit 213.

FIG. 44 shows an example of data in the board coordination, as illustrated in FIGS. 22 to 27. Data such as IDs of coordinated groups may be added to the board data 400 to permit management of board coordination data for every board, or to permit independent management of board coordination data, as shown in FIG. 44. A coordinated group ID4030 provides information for specifying groups of board coordination, and a coordinated group title 4031 is a title of a coordinated group input in FIGS. 22 and 25 in the case where a word comment for introduction of a coordinated, group is input. It is described in a coordinated group word comment 4032. A coordinated group board 4033 includes IDs and titles of respective boards listed in the pulldown menus 2074, 2080 (see FIGS. 24 and 27) displayed in a board upper portion.

A method of communication and a system therefor according to the invention will be summarized in the following manner According to the invention, in a method of communication and an apparatus in which the user terminal 111 is connected to a network, and cards (Information unit) are pasted on a base (information unit) called a communication board that is displayed on a screen of the user terminal 111 so as to have various information in common and to accumulate these information, link lines with an arrow are pasted on cards to display a progression, so that even a person participating in the course of a communication can easily grasp the procedure and content of the communication. In addition, the user terminal 111, the board manager terminal 121, and the community management server 101 are composed of known computers having the function of communication, and a screen of the user terminal 111, a screen of the board manager terminal 121, and a screen of the community management server 101 refer to screens of displays (not shown) connected to them. For example, in the case of creating boards representing information "about a town OO" by way of letters and picture images to collect and accumulate information, such as criticisms, wishes, or the like, with respect to the town, cards "OO", "X X, and "ΔΔ" are first pasted on aboard. Subsequently, a manager or a third person that has seen the board creates cards for questions and answers with respect to the cards "OO", "XX", and "ΔΔ" and proceeds to paste them on the board. In the case where a board manager 120, that is, a person capable of creating the board, has a need of making an answer in view of senders and contents of a card, the board manager 120 pastes a card for questions and opinions, on the card. In the case where a multiplicity of themes through a multiplicity of cards are noticed, also in the case where a multiplicity of cards are pasted as additional related cards on a particular card, the contents of cards (parent cards) of respective themes and cards for demanding questions and answers with respect to the themes become hard to read, and the interrelationships become indefinite and difficult to make out. Hereupon, cards presenting themes and related cards are visually discriminated by clearing attributes of cards and pasting link lines on the cards presenting themes and cards for opinions and questions to make their relevance definite. Then, link lines from additional cards are pasted on cards representing origins of communication, that is, cards presenting themes to make the cards themselves a series of information. Also, an arrow directed toward a card created just before, from a newly created card, is attached to a link line to clear a parentage, thereby making it possible grasp the progress of the procedure for communication at a glance. More specifically, cards are connected to one another by link lines ← and related to one another such that when a card presenting a theme is "X X", "XX", ←"□□ for XX" ←"◇ ◇ for □□ "←" ♦♦ for ◇ ◇" ← "OO for ♦♦". Also, link lines are pasted on and started from a card, from which the progress of the proceedings is originated, and they indicate locations on picture Images or texts in a board background displayed on the board, a location from which proceedings are originated is shown, and a card presenting a theme and cards for questions and answers are discriminated so as to be visually recognized. Of course, link lines from a single card can be pasted on a plurality of cards so as to have them definitely related to one another.

In this way, even when a plurality of cards presenting themes and a plurality of cards for questions and answers are pasted on a board, and even when respective cards are arranged randomly relative to a board, the interrelationships are made definite. Also, cards pasted on a board are simply stacked and displayed on the board so as to be movable to optional locations, and link lines for connection of cards to one another and of texts on a board to cards presenting themes can appearingly extend and contract accompanying movements of cards, so that respective cards can be rearranged and made easy to see. In this case, since cards presenting other themes and cards linked therewith only get in the way, they suffice to be collected and brought toward corners of the board.

In this way, while effective use can be made of an area of a board as a field for development of discussion with respect to one theme, it is necessary for the sake of understanding the attributes and contents of cards at a glance to decrease the display area of a card relative to a display through increasing a display area of the display, or a board, or the resolution of the display.

However, measures of exchanging a display or changing the resolution of a display cause a great burden on the board manager 120 and users, and so they are not preferable. Hereupon, the number of cards displayed on a board is limited to a predetermined number, and the number of cards pasted on a board is limited. The limited number is made constant irrespective of the display size of displays and the resolution and capacity of displays, so that the board manager 120 and participants have information of the same quality and the same number in common. Also, in the case where cards exceed the limited number, a board having the same background as that of the board is created, and cards of a required number for continuation of the communication are pasted on the former board so as to create a coordinated board, which in turn replaces the present board. Only necessary files are pasted on the coordinated board, which is not put into any complex state by cards, so that it becomes possible to smoothly continue the communication. As a result, a manager and participants in a conference have the same information in common so as to be able to monitor the progress the conference without depending upon display areas and the resolution of displays.

Also, there are some cases where a user 110 cannot be expected to constantly participate in a communication at all times, and he wants to know of the contents of the communication from his destination and to participate in the communication. In such cases, a communication system transmits data of boards and cards to a portable telephone, and participation in the communication is carried out from a portable terminal. Since a screen in a portable terminal, in particular, a portable telephone, is limited, it is not possible to correctly determine a card position relative to a board. In such a case, an area for pasting of a card transmitted from a portable side is ensured on the communication board to solve such a problem.

Also, in the case where a card or cards are added, or when new subscribers increase, it is desirable to provide notice assignment of the matter to a user 110 as a service, but notice assignment of all data from the communication system to the user terminal 111 will directly contribute to an increase in the communication load on both so as to require a substantial time. Hereupon, according to the embodiment, a mail server providing a private field for the user 110 is created so as to be able to store and update boards and cards of the communication system, and notice assignment of changes in the communication is communicated from the mail server to the user 110 at a desired date to achieve reduction of the communication load.

Also, a calendar made use of on the sides of the board manager 120 and the user 110 can be used for a communication system, but a simple calendar does not adapt itself to the communication system according to the invention.

Hereupon, a board capable of displaying cards in a time series order, for example, on a calendar, is created and icons as cards are pasted on day columns on the board. Since the Icons are related so as to open windows displaying letters and picture images when dragged, the entire communication can have information in common when the user 110 stores information of texts and picture images in relation to the icons. Also, since the icons are classified into a plurality of genres to cause accumulation of information by genre the calendar can be made to be highly useful. Of course, when notice assignment of data in the calendar is provided to the user 110 in cooperation with mall notice assignment in the manner described above, the calendar can be further Increased in value.

In addition, programs for realizing the functions of reception and transmission, generation, and accumulation of the premising information of the communication and information units forming a basis of the communication, the functions of reception and transmission, generation, and accumulation of information units forming the contents of the communication, and the function of effecting a processing by means of one of the information units or a combination of the information units, when it is instructed from the user terminal 111, to cause display or accumulation of the contents and the procedure of the communication, or to provide the function of the communication corresponding to an object or stage of the communication, the processing corresponding to the instruction, are suitably stored in fixed storage units of the community management server 101, the user terminals $111_1$ to $111_n$, and the board manager terminals $121_1$ to $121_n$. Also, these programs are recorded in recording media, such as the flexible disk, optical disk, magnetic disk or the like.

The invention is susceptible to various changes within a scope not departing from the gist of the invention, and shall naturally cover all changes that fall within the scope of the appended claims.

According to the invention, information units of a communication are of a multilayer structure composed of boards and cards, and are combined so as to be able to display or totalize the progress and contents of the communication in various manners, so that a user easily understands complex circumstances of the communication. Also, since information units, such as boards, cards or the like, are combined so as to be able to provide the function of a communication corresponding to an object and stage of the communication, it is possible to create a communication environment making participation of users easy.

What is claimed is:

1. A communication method for implementing smooth communication in a communication system, the communication system including a board manager terminal, a user terminal, and a community management server, wherein the board manager terminal, the user terminal, and the community management server are connected to one another via a communication network, the method comprising:

providing, by the board manager terminal, a board including premise information which is a premise of communication;

proving, by the user terminal, a card including a comment on the premise information or a comment on the comment, wherein the community management server includes storage means for storing the board and the card, input/output means, and control means and creates the board to which the card is attached, wherein the storage means in the community management server includes a board database for storing the board, associating information for identifying the board with information for identifying a board manager who provides the board, wherein the board database in the community management server stores a board registration screen for determining a specification of the board and the card, and wherein the control means in the community management server executes:

a step of, upon receiving a request to register the board from the board manager terminal through the input/output means, reading the board registration screen from the board database of the storage means and transmitting the board registration screen to the board manager terminal;

a step of receiving an instruction for determining a specification of the board and the card attached to the board, including:
(1) information for identifying a size, a type, and a title of the board and a character inputted to the board,
(2) information for identifying a file name or a display position of a background image of the board composed of a document, a map, a photograph, and the like,
(3) information for identifying a font size of a comment including in the card attached to the board, a genre of the card, and a card color corresponding to the genre, and
(4) information for identifying a board manager of the board manager terminal which has made the request to register the board, that is, information for identifying a manager name or a mail address of the board manager on the board registration screen from the board manager terminal through the input/output means; and a step of creating the board based on the determined specification, assigning information for identifying the board to the created board, and storing the created board in the board database associating information for identifying the created board with information for identifying the board manager who has provided the created board.

2. A communication system, for implementing smooth communication, the communication system comprising:

a board manager terminal for providing a board including premise information which is a premise of communication;

a user terminal for proving a card including a comment on the premise information or a comment on the comment; and a community management server which includes storage means for storing the board and the card, input/output means, and control means and creates the board to which the card is attached, wherein the board manager terminal, the user terminal, and the community management server are connected to one another via a communication network, wherein the storage means in the community management server includes a board database for storing the board, associating information for identifying the board with information for identifying a board manager who provides the board, the board database stores a board registration screen for determining a specification of the board and the card, wherein the control means in the community management server, upon receiving a request to register the board from the board manager terminal through the input/output means, reads the board registration screen from the board database of the storage means and transmits the board registration screen to the board manager terminal, receives an instruction for determining a specification of the board and the card attached to the board, including:
(1) information for identifying a size, a type, and a title of the board and a character inputted to the board,
(2) information for identifying a file name or a display position of a background image of the board composed of a document, a map, a photograph, and the like,
(3) information for identifying a font size of a comment including in the card attached to the board, a genre of the card, and a card color corresponding to the genre, and
(4) information for identifying a board manager of the board manager terminal which has made the request to resister the board, that is, information for identifying a manager name or a mail address of the board manager on the board registration screen from the board manager terminal through the input/output means, and creates the board based on the determined specification, assigns information for identifying the board to the created board, and stores the created board in the board database associating information for identifying the created board with information for identifying the board manager who has provided the created board.

3. A communication method for implementing smooth communication in a communication system, the communication system including a board manager terminal, a user terminal, and a community management server, wherein the board manager terminal, the user terminal and the community management server are connected to one another via a communication network, the method comprising:

providing, by the board manager terminal, a board including premise information which is a premise of communication;

proving, by the user terminal, a card including a comment on the premise information or a comment on the comment, wherein the community management server includes storage means for storing the board and the card, input/output means, and control means and creates the board to which the card is attached, wherein the storage means in the community management server, includes a board database for storing the board, associating information for identifying the board with information for identifying a board manager who provides the board, and a template database for storing a template, associating a purpose and a stage of the communication with the template which corresponds to the purpose and the stage and is a combination of the board and the card, and wherein the control means in the community management server executes:

a step of, upon receiving a request to use a template from the board manager terminal through the input/output means, referring to the purpose and the stage from the template database, creating a template selection screen for selecting the template, and transmitting the created template selection screen to the board manager terminal;

a step of receiving an instruction for determining the purpose of the communication and the stage according to the purpose on the template selection screen from the board manager terminal through the input/output means;

a step of referring to the template database, creating a board based on the template corresponding to the determined purpose and stage, and transmitting a board confirmation screen for registering information in the created board through the out/output means to the board manager terminal;
a step of receiving a request to register the created board including information registered in the created board on the board confirmation screen from the board manager terminal through the input/output means; and
a step of, based on the request to register the created board, storing the created board in the board database associating information for identifying the created board with information for identifying the board manager who has provided the created board.

4. A communication method for implementing smooth communication in a communication system, the communication system including a board manager terminal, a user terminal, and a community management server, wherein the board manager terminal, the user terminal and the community management server are connected to one another via a communication network, the method comprising:
providing, by the board manager terminal, a board including premise information which is a premise of communication;
proving, by the user terminal, a card including a comment on the premise information or a comment on the comment,
wherein the community management server includes storage means for storing the board and the card, input/output means, and control means and creates the board to which the card is attached,
wherein the storage means in the community management server includes a board database for storing the board, associating information for identifying the board with information for identifying a board manager who provides the board, and a card database for storing the card, associating information for identifying the card with information for identifying the board to which the card is attached and information for identifying a user who provides the card, and
wherein the control means in the community management server executes:
a step of, upon receiving a request to group the card from the board manager terminal through the input/output means, reading the board provided from the board manager by referring to the information for identifying the board manager from the board database, reading the card attached to the board provided from the board manager terminal by referring to the information for identifying the board to which the card is attached from the card database, creating a representative-card input screen for creating a representative card obtained by summarizing the card attached to the board provided from the board manager terminal, and transmitting the created representative-card input screen to the board manager terminal;
a step of receiving an instruction for determining the representative card including a comment of the grouped card or a comment of the representative card on the representative-card input screen from the board manager terminal through the input/output means; and
a step of creating the representative card based on the determination and storing the created representative card in the card database associating information for identifying the representative card with information for identifying a board to which the representative card is attached.

5. A communication method for implementing smooth communication in a communication system, the communication system including a board manager terminal, a user terminal, and a community management server, wherein the board manager terminal, the user terminal, and the community management server are connected to one another via a communication network, the method comprising:
providing, by the board manager terminal, a board including premise information which is a premise of communication;
proving, by the user terminal, a card including a comment on the premise information or a comment on the comment,
wherein the community storage management server includes storage means for storing the board and the card, input/output means, and control means and creates the board to which the card is attached,
wherein the storage means in the community management server includes a board database for storing the board, associating information for identifying the board with information for identifying a board manager who provides the board,
wherein the control means in the community management server executes:
a step of, upon receiving a request to ally the board from the board manager terminal through the input/output means, reading the board provided from the board manager by referring to the information for identifying the board manager from the board database, creating a board alliance registration screen for creating an alliance board obtained by allying the board, and transmitting the created board alliance registration screen to the board manager terminal;
a step of receiving an instruction for determining the alliance board including information for identifying the board provided from the board manager terminal which has made the request to ally the board or information for identifying a board which is provided from a board manager terminal other than the board manager terminal which has made the ally the board and allied with the board provided from the board manager terminal which has made the request to ally the board on the board alliance registration screen from the board manager terminal through the input/output means; and
a step of creating the alliance board based on the determination and storing the created alliance board in the board database associating information for identifying the alliance board with information for identifying a board constituting the alliance board.

6. A communication method for implementing smooth communication in a communication system, the communication system including a board manager terminal, a user terminal, and a community management server, wherein the board manager terminal, the user terminal, and the community management server are connected to one another via a communication network, the method comprising:
providing, by the board manager terminal, a board including premise information which is a premise of communication;
proving, by the user terminal, a card including a comment on the premise information or a comment on the comment,
wherein the community management server includes storage means for storing the board and the card, input/output means, and control means, and creates the board to which the card is attached,
wherein the storage means in the community management server includes a board database for storing the board, associating information for identifying the board with information for identifying a board manager who provides the board, and a card database for storing the card, associating information for identifying the card with information for identifying the board to which the card is attached and information for identifying a user who provides the card, wherein the control means in the community management server executes:

a step of, upon receiving a request to divide the board from the board manager terminal through the input/output means, reading the board provided from the board manager by referring to the information for identifying the board manager from the board database, reading the card attached to the board provided from the board manager terminal by referring to the information for identifying the board to which the card is attached from the card database, creating a board management screen for determining a division board, and transmitting the created board management screen to the board manager terminal;

a step of receiving an instruction for determining the division board and a card attached to the division board on the board management screen from the board manager terminal through the input/output means;

a step of, upon receiving the instruction for determining the division board and the card attached to the division board from the board manager terminal through the input/output means, creating a post-division board to which the card specified at the board manager terminal is attached from a pre-division board which is divided by copying based on the determination; and a step of storing the created post-division board in the board database associating information for identifying the post-division board with information for identifying the board manager, and storing the card specified at the board manager terminal in the card database associating information for identifying the card determined at the board manager terminal with information for identifying the post-division board to which the card specified at the board manager terminal is attached and information for identifying a user who provides the determined card.

7. A communication method for implementing smooth communication in a communication system, the communication system including a board manager terminal, a user terminal, and a community management server, wherein the board manager terminal, the user terminal, and the community management server are connected to one another via a communication network, the method comprising:

providing, by the board manager terminal, a board including premise information which is a premise of communication;

proving, by the user terminal, a card including a comment on the premise information or a comment on the comment, wherein the community storage management server includes storage means for storing the board and the card, input/output means, and control means and creates the board to which the card is attached, wherein the storage means in the community management server includes a board database for storing the board, associating information for identifying the board with information for identifying a board manager who provides the board, and a card database for storing the card, associating information for identifying the card with information for identifying the board to which the card is attached and information for identifying a user who provides the card, and an aggregation database for storing an aggregation result obtained by aggregating card information and board information, wherein the control means in the community management server executes:

a step of receiving, through the input/output means, an aggregation unit in which at least one of the board and the card is an aggregation object and an aggregation axis indicative of aggregation information for each aggregation unit, determined at the user terminal;

a step of referring to the board and the card from the board database and the card database, aggregating the board information and the card information based on the aggregation unit and the aggregation axis, and storing the aggregation result into the aggregation database; and a step of transmitting the aggregation result stored in the aggregation database through out/output means to the user terminal that has determined the aggregation unit and the aggregation axis.

8. The communication method according to claim 1, wherein the storage means in the community management server stores, as a board stored in the storage means, a private board which each user terminal can individually refer to, and stores, as a card stored in the storage means, a private card attached to the private board, and wherein the control means in the community management server executes:

a step of, when board information or card information stored in the storage means is updated through the input/output means, updating private-board information or private-card information as well; and a step of, upon receiving a request to acquire private-board information or private-card information which the user terminal can refer to through the input/output means, transmitting the updated private-board information or private-card information to the user terminal.

9. The communication method according to claim 1, wherein the storage means in the community management server includes a user database for storing information for identifying user terminal, information concerning a user of the user terminal, and information for determining whether or not to disclose the information concerning the user, associated with one another, and wherein the control means in the community management server executes:

a step of, upon receiving a request to disclose the information concerning the user from the user terminal through the input/output means, referring to the information for identifying the user terminal from the user database, identifying the information concerning the user who has made the request, and making an update to disclose the identified information concerning the user.

10. The communication system according to claim 2, wherein the storage means in the community management server stores, as a board stored in the storage means, a private board which each user terminal can individually refer to, and stores, as a card stored in the storage means, a private card attached to the private board, and wherein the control means in the community management server, when board information or card information stored in the storage means is updated through the input/output means, updates private-board information or private-card information as well, and upon receiving a request to acquire private-board information or private-card information which the user terminal can refer to through the input/output means, transmits the updated private-board information or private-card information to the user terminal.

11. The communication system according to claim 2, wherein the storage means in the community managements server includes a user database for storing information for identifying the user terminal, information concerning a user of the user terminal, and information for determining whether or not to disclose the information concerning the user, associated with one another, and wherein the control means in the community management server, upon receiving a request to disclose the information concerning the user from the user terminal through the input/output means, refers to the information for identifying the user terminal from the user database, identifies the information concerning the user who has made the request, and makes an update to disclose the identified information concerning the user.

12. A communication system, for implementing smooth communication, the communication system comprising:

a board manager terminal for providing a board including premise information which is a premise of communication;

a user terminal for proving a card including a comment on the premise information or a comment on the comment; and a community management server which includes storage means for storing the board and the card, input/output means, and control means and creates the board to which the card is attached, wherein the board manager terminal, the user terminal, and the community management terminal are connected to one another via a communication network, wherein the storage means in the community management server includes a board database for storing the board, associating information for identifying the board with information for identifying a board manager who provides the board, and a template database for storing a template, associating a purpose and a stage of the communication with the template which corresponds to the purpose and the stage and is a combination of the board and the card, wherein the control means in the community management server, upon receiving a request to use a template from the board manager terminal through the input/output means, refers to the purpose and the stage from the template database, creates a template selection screen for selecting the template, and transmits the created template selection screen to the board manager terminal, receives an instruction for determining the purpose of the communication and the stage according to the purpose the template selection screen from the board manager terminal through the input/output means, refers to the template database, creates a board based on the template corresponding to the determined purpose and stage, and transmits a board confirmation screen for registering information in the created board through the input/output means to the board manager terminal, receives a request to register the created board including information registered in the created board on the board confirmation screen from the board manager terminal through the input/output means, and based on the request to register the created board, stores the created board in the board database associating information for identifying the created board with information for identifying the board manager who has provided the created board.

13. A communication system, for implementing smooth communication, the communication system including:

a board manager terminal for providing a board including premise information which is a premise of communication;

a user terminal for proving a card including a comment on the premise information or a comment on the comment; and a community management server which includes storage means for storing the board and the card, input/output means, and control means and creates the board to which the card is attached are connected to one another via a communication network, wherein the storage means in the community management server includes a board database for storing the board, associating information for identifying the board with information for identifying a board manager who provides the board, and a card database for storing the card, associating information for identifying the card with information for identifying the board to which the card is attached and information for identifying a user who provides the card, wherein the control means in the community management server, upon receiving a request to group the card from the board manager terminal through the input/output means, reads the board provided from the board manager by referring to the information for identifying the board manager from the board database, reads the card attached to the board provided from the board manager terminal by referring to the information for identifying the board to which the card is attached from the card database, creates a representative-card input screen for crating are representative card obtained by summarizing the card attached to the board provided from the board manager terminal, and transmits the created representative-card input screen to the board manager terminal, receives an instruction for determining the representative card including a comment of the grouped card or a comment of the representative card on the representative-card input screen from the board manager terminal through the input/output means, and creates the representative card based on the determination and stores the created representative card in the card database associating information for identifying the representative card with information for identifying a board to which the representative card is attached.

14. A communication system, for implementing smooth communication, the communication system comprising:

a board manager terminal for providing a board including premise information which is a premise of communication a user terminal for proving a card including a comment on the premise information or a comment on the comment; and a community management server which includes storage means for storing the board and the card, input/output means, and control means and creates the board to which the card is attached, wherein the board manager terminal, the user terminal and the community management server are connected to one another via a communication network, wherein the storage means in the community management server includes a board database for storing the board, associating information for identifying the board with information for identifying a board manager who provides the board, wherein the control means in the community management server, upon receiving a request to ally the board from the board manager terminal through the input/output means, reads the board provided from the board manager by referring to the information for identifying the board manager from the board database, creates aboard alliance registration screen for creating an alliance board obtained by allying the board, and transmits the created board alliance registration screen to the board manager terminal, receives an instruction for determining the alliance board including information for identifying the board provided from the board manager terminal which has made the request to ally the board or information for identifying a board which is provided from a board manager terminal other than the board manager terminal which has made the request to all the board and allied with the board provided from the board manager terminal which has made the request to ally the board on the board alliance registration screen from the board manager terminal through the input/output means, and creates the alliance board based on the determination and stores the created alliance board in the board database associating information for identifying the alliance board with information for identifying a board constituting the alliance board.

15. A communication system, for implementing smooth communication, the communication system comprising:

a board manager terminal for providing a board including premise information which is a premise of communication;

a user terminal for proving a card including a comment on the remise information or a comment on the comment; and a community management server which includes storage means for storing the board and the card, input/output means, and control means and creates the board to which the card is attached are connected to one another via a communication network, wherein the storage means in the community management server includes a board database for storing the board, associating information for identifying the board with information for identifying a board manager who provides the board, and a card database for storing the card, associating information for identifying the card with information for identifying the board to which the card is attached and information for identifying a user who provides the card, wherein the control means in the community management server, upon receiving a request to divide the board from the board manager terminal through the input/output means, reads the board provided from the board manager by referring to the information for identifying the board manager from the board database, reads the card attached to the board provided from the board manager terminal by referring to the information for identifying the board to which the card is attached from the card database, creates a board management screen for determining a division board, and transmits the created board management screen to the board manager terminal, receives an instruction for determining the division board and a card attached to the division board on the board management screen from the board manager terminal through the input/output means, upon receiving the instruction for determining the division board and the card attached to the division board from the board manager terminal through the input/output means, creates a post-division board to which the card specified at the board manager terminal is attached from a pre-division board which is divided by copying based on the determination, and stores the created post-division board in the board database associating information for identifying the post-division board with information for identifying the board manager, and stores the card specified at the board manager terminal in the card database associating information for identifying the card determined at the board manager terminal with information for identifying the post-division board to which the card specified at the board manager terminal is attached and information for identifying a user who provides the determined card.

16. A communication system, for implementing smooth communication, the communication system comprising:

a board including premise information which is a premise of communication;

a user terminal for proving a card including a comment on the premise information or a comment on the comment; and a community management server which includes storage means for storing the board and the card, input/output means, and control means and creates the board to which the card is attached are connected to one another via a communication network, wherein the storage means in the community management server includes a board database for storing the board, associating information for identifying the board with information for identifying a board manager who provides the board, and a card database for storing the card, associating information for identifying the card with information for identifying the board to which the card is attached and information for identifying a user who provides the card, and an aggregation database for storing an aggregation result obtained by aggregating card information and board information, wherein the control means in the community management server, receives, through the in out/output means, an aggregation unit in which at least one of the board and the card is an aggregation object and an aggregation axis indicative of aggregation information for each aggregation unit, determined at the user terminal, refers to the board and the card from the board database and the card database, aggregates the board information and the card information based on the aggregation unit and the aggregation axis, and stores the aggregation result into the aggregation database, and transmits the aggregation result stored in the aggregation database through the input/output means to the user terminal that has determined the aggregation unit and the aggregation axis.

* * * * *